(12) United States Patent
Blackley et al.

(10) Patent No.: US 10,984,137 B2
(45) Date of Patent: Apr. 20, 2021

(54) SECURE DATA AT REST

(71) Applicant: Charter Communications Operating, LLC, St. Louis, MO (US)

(72) Inventors: James Anderson Blackley, Rockville Center, NY (US); Jay Eric Carlson, Weldon Springs, MO (US); Michael David Hanrahan, Chesterfield, MO (US); Bajeed Pattan, Ballwin, MO (US); Christopher Scott Alcott, Manchester, MO (US)

(73) Assignee: Charter Communications Operating, LLC, St. Louis, MO (US)

( * ) Notice: Subject to any disclaimer, the term of this patent is extended or adjusted under 35 U.S.C. 154(b) by 250 days.

(21) Appl. No.: 16/277,740

(22) Filed: Feb. 15, 2019

(65) Prior Publication Data

US 2020/0265170 A1    Aug. 20, 2020

(51) Int. Cl.
*H04L 9/34* (2006.01)
*H04L 9/12* (2006.01)
(Continued)

(52) U.S. Cl.
CPC .......... *G06F 21/78* (2013.01); *G06F 12/1408* (2013.01); *G06F 21/602* (2013.01);
(Continued)

(58) Field of Classification Search
None
See application file for complete search history.

(56) References Cited

U.S. PATENT DOCUMENTS

| | | |
|---|---|---|
| 6,970,886 B1 | 11/2005 | Conwell et al. |
| 8,464,311 B2 | 6/2013 | Ashley et al. |
| | (Continued) | |

FOREIGN PATENT DOCUMENTS

| | | |
|---|---|---|
| WO | WO-2012/000092 A1 | 1/2012 |
| WO | WO-2016/064888 A1 | 4/2016 |

OTHER PUBLICATIONS

Privacy Data Envelope: Concept and Implementation. Ghorbel. IEEE. (Year: 2011).*

(Continued)

*Primary Examiner* — Venkat Perungavoor
(74) *Attorney, Agent, or Firm* — Marshall, Gerstein & Borun LLP

(57) ABSTRACT

A method for providing and maintaining secure storage of data includes cloaking the data by retrieving, from a database and using a first set of user-specific cloaking sequences and a first mapping, a first set of hidden sequences, and applying the data and the first set of hidden sequences as inputs to a cloaking algorithm. The cloaked data is stored in a persistent memory. The method further includes, during a later, second time period, re-cloaking the cloaked data by uncloaking the cloaked data using the first set of hidden sequences, retrieving, from the database and using the first set of user-specific cloaking sequences and a different, second mapping, a second set of one or more hidden sequences, and applying the uncloaked data and the second set of hidden sequences as inputs to the cloaking algorithm. The re-cloaked data is stored in the persistent memory.

20 Claims, 16 Drawing Sheets

(51) Int. Cl.
*G06F 21/78* (2013.01)
*G06F 21/62* (2013.01)
*G06F 21/60* (2013.01)
*G06F 12/14* (2006.01)
*H04L 9/22* (2006.01)
*H04K 1/02* (2006.01)

(52) U.S. Cl.
CPC ........ *G06F 21/604* (2013.01); *G06F 21/6218* (2013.01); *G06F 2212/402* (2013.01); *G06F 2221/2107* (2013.01); *G06F 2221/2141* (2013.01)

(56) References Cited

U.S. PATENT DOCUMENTS

| | | | |
|---|---|---|---|
| 8,826,455 | B2 | 9/2014 | Julisch et al. |
| 9,224,000 | B1 | 12/2015 | Ghetti |
| 9,313,179 | B1 * | 4/2016 | Yung ................ G06F 21/6227 |
| 9,495,544 | B2 | 11/2016 | Aissi et al. |
| 9,639,714 | B1 | 5/2017 | Carlson et al. |
| 9,749,302 | B1 | 8/2017 | Copeland et al. |
| 2008/0114884 | A1 | 5/2008 | Hewes et al. |
| 2010/0026509 | A1 * | 2/2010 | Boehm ................ G08G 1/166 340/686.6 |
| 2012/0254386 | A1 | 10/2012 | Smith et al. |
| 2013/0246813 | A1 * | 9/2013 | Mori ........................ H04L 9/14 713/193 |
| 2013/0305345 | A1 | 11/2013 | Bugenhagen |
| 2014/0177825 | A1 | 6/2014 | Mattsson et al. |
| 2015/0007265 | A1 | 1/2015 | Aissi et al. |
| 2016/0063269 | A1 | 3/2016 | Liden et al. |
| 2016/0292455 | A1 * | 10/2016 | Jebara ................ G06F 16/9535 |
| 2017/0111326 | A1 * | 4/2017 | Jadeja ................ H04L 63/0428 |
| 2018/0300507 | A1 * | 10/2018 | Uhr ........................ G06F 21/64 |

OTHER PUBLICATIONS

Privacy-Preserving Data Mining of Distributed Databases Using Naïve Bayes Classifier. Ouda. (Year: 2013).*

Scrambling-based speech encryption via compressed sensing. Zeng. EURASIP Springer. (Year: 2012).*

* cited by examiner

SECURE DATA AT REST

TECHNICAL FIELD

The present disclosure generally relates to data security and, more specifically, to systems and methods for providing and maintaining the secure storage of sensitive (e.g., confidential) or potentially sensitive data.

BACKGROUND

Techniques for preventing unauthorized access to data typically focus on securely transmitting the data between two endpoints or, less commonly, on securely inputting the data (e.g., when a user enters information via a keypad). While some techniques are applicable to data storage (e.g., encryption of data already residing on a storage device), these approaches are typically static. That is, if an unauthorized user "cracks the code" for a particular set of files in a storage device, he or she may have unfettered access to those files from that point in time onwards (e.g., even as the files are updated over time). Conventional techniques can also suffer from other drawbacks. For example, such techniques may lack the flexibility to tailor the level of security to different sets of data and/or different users (e.g., data owners), or lack the ability to respond to security threats (e.g., data breaches) in a timely and effective manner.

SUMMARY

In one embodiment, a method for providing and maintaining secure storage of target data includes, during a first time period in which a server provides a first mapping between user-specific cloaking sequence elements and hidden sequence elements, cloaking the target data. Cloaking the target data includes retrieving, from a database and using (i) a first set of one or more user-specific cloaking sequences and (ii) the first mapping, a first set of one or more hidden sequences, and generating cloaked target data at least by applying the target data and the first set of hidden sequences as inputs to a cloaking algorithm. The method also includes storing the cloaked target data in a persistent memory. The method further includes, during a second time period, occurring after the first time period, in which the server provides a different, second mapping between the user-specific cloaking sequence elements and the hidden sequence elements, re-cloaking the cloaked target data. Re-cloaking the cloaked target data includes retrieving the cloaked target data from the persistent memory, again retrieving the first set of hidden sequences from the database, and generating uncloaked target data at least by applying the cloaked target data and the first set of hidden sequences as inputs to an inverse of the cloaking algorithm. Re-cloaking the cloaked target data also includes retrieving, from the database and using (i) the first set of user-specific cloaking sequences and (ii) the second mapping, a second set of one or more hidden sequences that is different than the first set of hidden sequences, and generating re-cloaked target data at least by applying the uncloaked target data and the second set of hidden sequences as inputs to the cloaking algorithm. The method also includes storing the re-cloaked target data in the persistent memory.

In another embodiment, a non-transitory, computer-readable medium stores instructions that, when executed by one or more processors, cause the one or more processors to, during a first time period in which a server provides a first mapping between user-specific cloaking sequence elements and hidden sequence elements, cloak target data. Cloaking the target data includes retrieving, from a database and using (i) a first set of one or more user-specific cloaking sequences and (ii) the first mapping, a first set of one or more hidden sequences, and generating cloaked target data at least by applying the target data and the first set of hidden sequences as inputs to a cloaking algorithm. The instructions also cause the one or more processors to store the cloaked target data in a persistent memory. The instructions also cause the one or more processors to, during a second time period, occurring after the first time period and in which the server provides a different, second mapping between the user-specific cloaking sequence elements and the hidden sequence elements, re-cloak the cloaked target data. Re-cloaking the cloaked target data includes retrieving the cloaked target data from the persistent memory, again retrieving the first set of hidden sequences from the database, and generating uncloaked target data at least by applying the cloaked target data and the first set of hidden sequences as inputs to an inverse of the cloaking algorithm. Re-cloaking the cloaked target data also includes retrieving, from the database and using (i) the first set of user-specific cloaking sequences and (ii) the second mapping, a second set of one or more hidden sequences that is different than the first set of hidden sequences, and generating re-cloaked target data at least by applying the uncloaked target data and the second set of hidden sequences as inputs to the cloaking algorithm. The instructions also cause the one or more processors to store the re-cloaked target data in the persistent memory.

In another embodiments, a computing system includes one or more processors, a first memory storing target data, and a second memory storing instructions. When executed by the one or more processors, the instructions cause the computing system to, during a first time period in which a server provides a first mapping between user-specific cloaking sequence elements and hidden sequence elements, cloak the target data. Cloaking the target data includes retrieving, from a database and using (i) a first set of one or more user-specific cloaking sequences and (ii) the first mapping, a first set of one or more hidden sequences, and generating cloaked target data at least by applying the target data and the first set of hidden sequences as inputs to a cloaking algorithm. The instructions also cause the computing system to store the cloaked target data in a persistent memory. The instructions also cause the computing system to, during a second time period, occurring after the first time period and in which the server provides a different, second mapping between the user-specific cloaking sequence elements and the hidden sequence elements, re-cloak the cloaked target data. Re-cloaking the cloaked target data includes retrieving the cloaked target data from the persistent memory, again retrieving the first set of hidden sequences from the database, and generating uncloaked target data at least by applying the cloaked target data and the first set of hidden sequences as inputs to an inverse of the cloaking algorithm. Re-cloaking the cloaked target data also includes retrieving, from the database and using (i) the first set of user-specific cloaking sequences and (ii) the second mapping, a second set of one or more hidden sequences that is different than the first set of hidden sequences, and generating re-cloaked target data at least by applying the uncloaked target data and the second set of hidden sequences as inputs to the cloaking algorithm. The instructions also cause the computing system to store the re-cloaked target data in the persistent memory.

BRIEF DESCRIPTION OF THE DRAWINGS

FIGS. 7A through 7F depict example screens of a user interface that may be generated and displayed within the system of FIG. 6.

FIG. 8 depicts example database structures that may be utilized in the system of FIG. 6.

DETAILED DESCRIPTION

Figure 1:
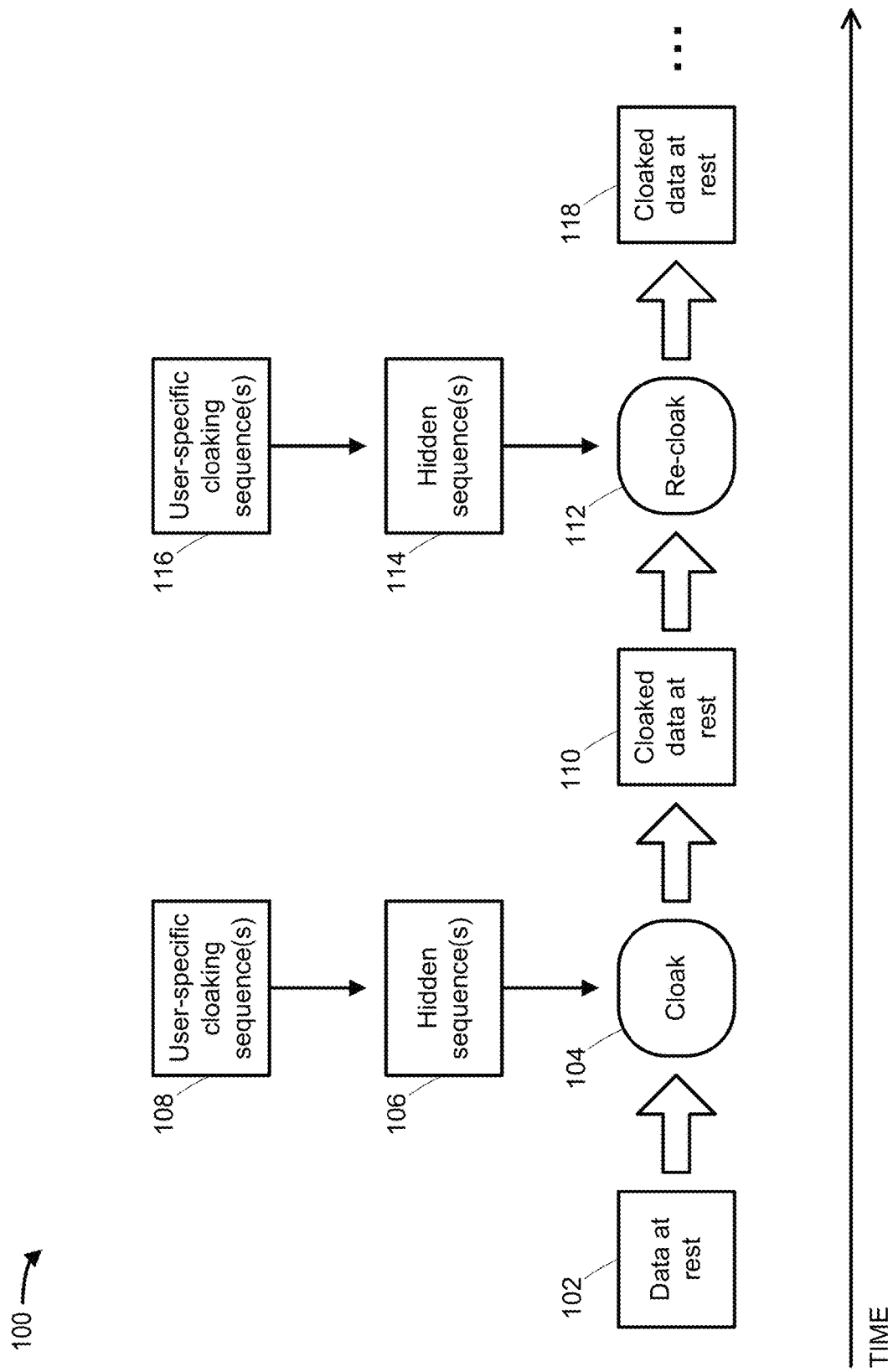
FIG. 1 depicts an example process in which secure storage of data is provided and maintained over time.

Various aspects of the present disclosure provide systems and methods for cloaking/obfuscating "at rest" data (i.e., data stored in a persistent memory for some time period) in a manner that provides and maintains highly secure storage. The protected data may include technical files, password lists, financial information, medical/health information, customer lists, social security numbers, and/or any other type(s) of sensitive and/or potentially sensitive data. The techniques described herein may be used for long-term data storage (e.g., archived data), short-term storage (e.g., in a portable memory device for physically transferring a file to a new location), or any other duration or purpose of data storage.

In some aspects of the present disclosure, one or more cloaking sequences (i.e., ordered sequences of images, numbers, letters, and/or any other suitable type of elements that can be visually portrayed) are specific to a user whose data is being protected. Users may select cloaking sequences by selecting images or other elements in a particular order, for example, or may simply be assigned a randomly-generated cloaking sequence, etc. As used herein, the term "user" or "user-specific" may, but does not necessarily, refer to a particular person. For example, cloaking sequences may instead be specific to a particular group of people, or to a particular entity (e.g., a company) that is associated with different people over time, and so on. It is also understood that any reference herein to something (e.g., a cloaking sequence) being "user-specific" does not necessarily mean that the thing is not also specific to any other user (e.g., if two or more users coincidentally choose a same set of cloaking sequences).

A user's cloaking sequence(s) dictate how that user's data (e.g., one or more data files) is cloaked. Specifically, in some embodiments, each user-specific cloaking sequence is used to access/retrieve another, "hidden" sequence that corresponds to the user-specific cloaking sequence, yet remains unknown to the user. The corresponding hidden sequence(s) may be retrieved by accessing a "crypt" (secure database) maintained by a remote server. For example, the crypt may store associations between (1) the collection of elements (e.g., images) from which users can select their cloaking sequences, and (2) the collection of elements (e.g., integers, and/or bit strings, etc.) from which hidden sequences can be formed. Thus, access to the crypt may allow a hidden sequence to be constructed element-by-element for any given user-specific cloaking sequence. Once the hidden sequence(s) are retrieved/determined, the hidden sequence(s) may be directly applied, along with the data to be protected, as inputs to a cloaking algorithm that generates cloaked data, and the cloaked data may be securely stored in the storage device (e.g., memory stick(s), memory card(s), portable hard drive(s), memory chip(s), etc.).

Any suitable cloaking algorithm may be used. In some embodiments, for example, any suitable data obfuscation technique from among the techniques described in U.S. Pat. No. 9,639,714 (Carlson et al., entitled "Secure Transmission of Sensitive Data") and/or U.S. Pat. No. 9,749,302 (Copeland et al., entitled "Secure Collection of Sensitive Data") may be used to cloak the data. For example, the hidden sequence(s) may be used as the "virtual space coordinates" to which various bit values (of the original/uncloaked data) are mapped within each of one or more mapping layers. The disclosure of each of U.S. Pat. Nos. 9,639,714 and 9,749,302 is hereby incorporated herein by reference in its entirety.

Alternatively, one of the cloaking algorithms disclosed herein may be used to cloak/obfuscate the data. In some embodiments, for example, a "primary" user-specific cloaking sequence (e.g., a first sequence of images) is associated with a hidden sequence of integers, while a "secondary" user-specific cloaking sequence (e.g., a second sequence of images) is associated with a hidden sequence of bit sets. The primary user-specific cloaking sequence may be used to identify offset positions within the data to be cloaked, while the secondary user-specific cloaking sequence may be used to perform one or more operations at those offset positions (e.g., inserting different ones of the bit sets at different offset positions, or deleting bits that match the bit sets if matching bits exist at the different offset positions, etc.), as discussed in further detail below. It is understood that, although this description refers to "bit" sets and operations on "bits" of data, any of the operations discussed herein may be performed on a per-bit basis, on a per-byte basis, or on any other suitable basis (e.g., operating on blocks of four bits, or blocks of 16 bits, etc.).

To maintain a high level of security, the associations/mappings between elements of user-specific cloaking sequences and elements of hidden sequences may change over time (e.g., automatically on a periodic basis, or in response to receiving indications of events such as attempted data breaches or security upgrades, etc.). Moreover, in some embodiments and scenarios, a user may change his or her user-specific cloaking sequence(s), which inherently causes the corresponding hidden sequence(s) to change. Whether the hidden sequence(s) change due to a user change, or due to a new set of associations/mappings at the crypt, the user's cloaked data may be "re-cloaked" using the new hidden sequence(s). To this end, the data may be uncloaked by applying the old/previous hidden sequence(s) and the cloaked data as inputs to an inverse of the cloaking algorithm. Thereafter, the new hidden sequence(s) and the uncloaked data are applied as inputs to the cloaking algorithm, and the resulting, re-cloaked data is again stored in the storage device. Thus, any unauthorized person (or computer) attempting to access the stored data may have a very limited time window to determine how to do so and, even in the unlikely event of success, would need to restart the effort each time that any hidden sequence changes if illicit access to current versions of the data/files is to be maintained.

In some embodiments, multiple layers of cloaking are applied to the stored data, to provide one or more additional layers of security. For example, a first combination of user-specific cloaking sequences may be used to achieve a first layer of cloaking, and a second combination of user-specific cloaking sequences may be used to achieve a second layer of cloaking (i.e., by further cloaking the data that has already been cloaked once).

In some use cases, the number of layers used to cloak any particular data may be set based on the user and/or how sensitive the data is. For example, a first user may need to select two cloaking sequences, while a second user may need to select three (or four, five, etc.) cloaking sequences. Similarly, in some embodiments, the lengths of one or more of the cloaking sequences may be set based on how sensitive the data is. Moreover, the number of layers and/or lengths of cloaking sequences may be set based on how much "at rest" the data is. If data is archived and will likely not require frequent user access, for example, more cloaking layers and/or longer cloaking sequences may be appropriate (e.g., relative to data that is stored on a flash drive and will likely be used at various times during an upcoming business trip, etc.).

In some embodiments and scenarios where structured data is being cloaked, the data may be cloaked in its entirety (e.g., entire files), or only particular portions of the structured data may be cloaked (e.g., particular fields of files). The user may specify which type of cloaking (e.g., "full" or "envelope" cloaking) is to be applied to the structured data, for example.

Various aspects of the present disclosure also provide for administration of a secure data storage system. In some embodiments, administration (e.g., control and access) functions are divided among each user and a "hyper controller." For example, the user may be viewed as a relatively low-level administrator, while the hyper controller may be viewed as a super administrator. Privileges afforded to each user may include, for example, setting up user accounts (e.g., by creating a login and password), setting up a "master" key for the user, and setting up cloaking sequences for the user. The user may need to use his/her master key to perform basic functions of the secure data storage system, such as selecting files to be cloaked and viewing files that are already cloaked. The master key (along with login, password, etc.) of each user is stored in the crypt and, in some embodiments, is also cloaked during storage. The user's cloaking sequence(s) is/are also stored in the crypt, and also may be cloaked during storage.

Privileges afforded to the hyper controller may include, for example, overriding users' master keys, overriding user-specific cloaking sequences, and overriding hidden sequences. The hyper controller may also have other privileges, such as setting security levels (e.g., the required number of cloaking sequences) for particular users and/or data. In some embodiments, and in some scenarios (e.g., if a large breach is detected or suspected), the hyper controller may suspend some or all communication with the crypt, making it impossible to retrieve any hidden sequences, and therefore making it impossible to uncloak any data. The hyper controller may be a person or group of people (e.g., an IT department), for example. In some embodiments, certain hyper controller functions are performed automatically by a computer (e.g., automatically shutting down access to the crypt in response to issuance of a data breach alert).

If a user forgets his/her master key, or if the user becomes incapacitated (e.g., dies), his or her data may become inaccessible. To mitigate this risk, while also preserving a certain level of trust that the user's data will not be misappropriated, a user may in some embodiments generate (or authorize the generation of) two or more "split delegate" keys, which act as a backup or alternative to the user's own master key. Each split delegate key may be given to an independent party or person (e.g., different employees within a company, or different familial relatives with adverse financial interests, etc.). To recover a user's cloaked data, all of the split delegate keys generated for that user must be jointly used (e.g., jointly entered via one or more graphical user interfaces of software applications executing on one or more computers). In some embodiments, use of the split delegate keys triggers a notification to the user, to prevent undesired use of the split delegate keys without the user's knowledge.

Additional details of these and other embodiments, as well as additional aspects of the invention, are described below with reference to FIGS. 1 through 11.

FIG. 1 depicts an example process 100 in which secure storage of data is provided and maintained over time. As seen in FIG. 1, data 102 that is at rest (i.e., stored in a persistent memory of one or more storage devices) is cloaked at stage 104. In particular, at stage 104, the data 102 and one or more hidden sequences 106 are applied as inputs to a cloaking algorithm. The hidden sequence(s) 106 are derived from (i.e., determined based upon) one or more user-specific cloaking sequences 108, as discussed in further detail below. The cloaking sequence(s) 108 may be sequences of user-selected images (e.g., icons, graphics, digital photos, etc.), numbers, letters, words, and/or any other elements that can be visually expressed, and the hidden sequences 106 may be sequences of any elements (e.g., integers, bit strings, etc.) that can be directly operated upon by the cloaking algorithm.

The cloaking algorithm generates cloaked data 110 that is stored (at rest) within the persistent memory. At stage 112, however, the cloaked data 110 is re-cloaked. Stage 112 may be triggered at some later time by a periodic update of the hidden associations between user-specific cloaking sequence elements and hidden sequence elements, or by the user's selection of a new set of cloaking sequences, for example. While not shown in FIG. 1, the re-cloaking at stage 112 may require that the cloaked data 110 first be uncloaked by applying an inverse of the cloaking algorithm that was applied at stage 104, with the hidden sequence(s) 106 being input to the inverse cloaking algorithm (as discussed in further detail below).

Once the data is uncloaked using the inverse cloaking algorithm, the data is re-cloaked at stage 112 by again applying the cloaking algorithm, but now using the new hidden sequence(s) 114 as input(s). In embodiments/scenarios where the re-cloaking was triggered by a new set of associations between cloaking sequence elements and hidden sequence elements, hidden sequence(s) 114 is/are derived from cloaking sequence(s) 116 that is/are identical to cloaking sequence(s) 108. In embodiments/scenarios where the re-cloaking was triggered by a user selection of one or more new cloaking sequences, however, hidden sequence(s) 114 is/are derived from cloaking sequence(s) 116 that is/are different than cloaking sequence(s) 108. The cloaking algorithm generates re-cloaked data 118, which is stored (at rest) within the persistent memory.

Re-cloaking similar to that performed at stage 112 (e.g., using the same cloaking algorithm) may be repeated any desired number of times, on any desired time basis and/or upon any desired trigger, depending on the embodiment and/or scenario. For example, periodic updates of the hidden associations between cloaking sequence elements and hidden sequence elements may result in periodic re-cloaking of the data at rest. As another example, a hyper controller may trigger re-cloaking by causing one or more hidden associations to change whenever a breach attempt is detected or suspected, or whenever the security level of a certain data collection has been upgraded, etc. A user change to the cloaking sequence(s) may also trigger a re-cloaking similar to that performed at stage 112.

Figure 2:
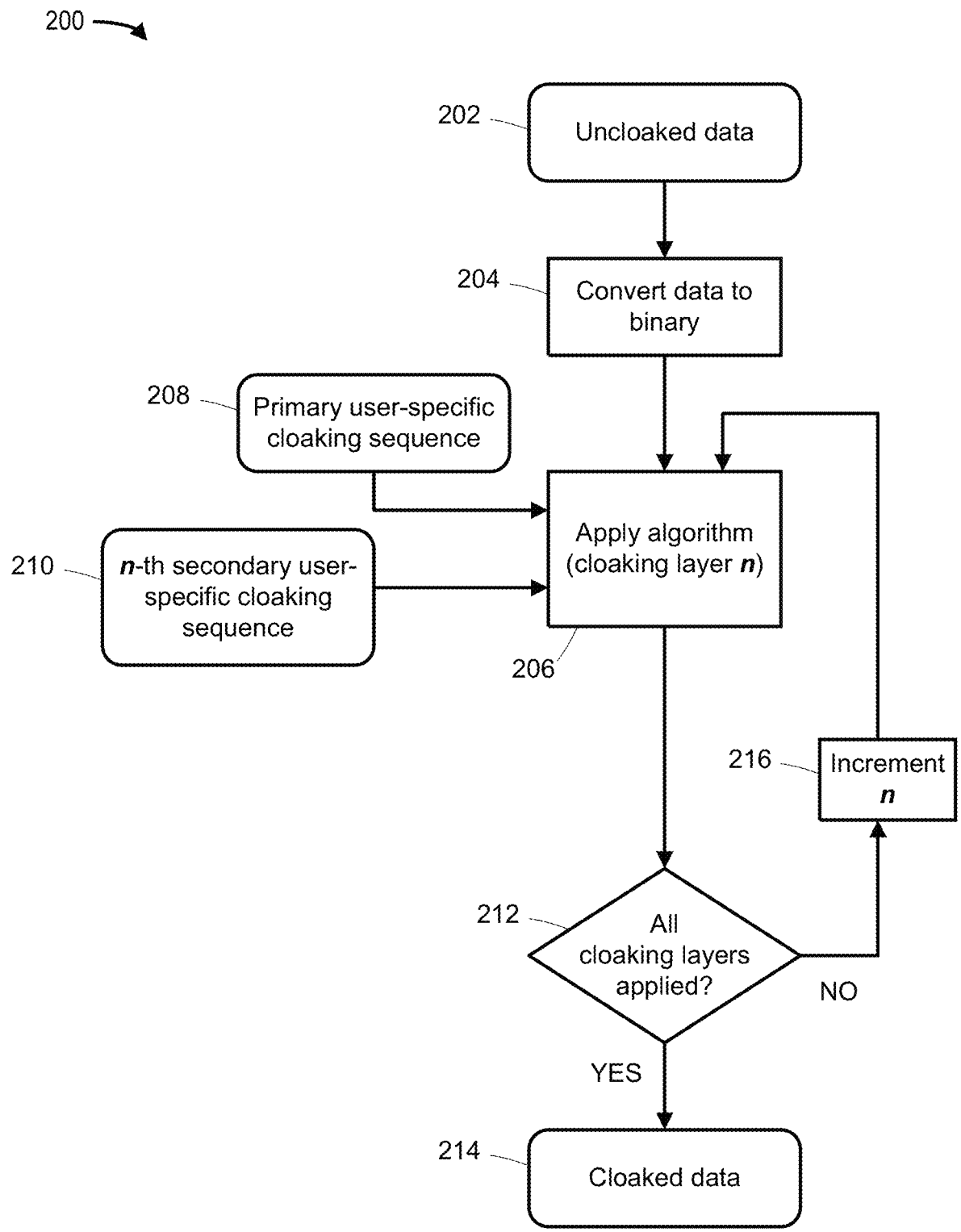
FIG. 2 is a flow diagram of an example algorithm for cloaking data based on user-selected cloaking sequences.

Various example cloaking algorithms (e.g., which may be applied at stages 104 and 112 of the process 100) will now be discussed with reference to FIGS. 2 through 5. Referring first to FIG. 2, an example algorithm 200 reflects single layer or multilayer cloaking. While FIG. 2 shows an embodiment in which the user has two and only two user-specific cloaking sequences, in other embodiments the user may have only one user-specific cloaking sequence, or more than two user-specific cloaking sequences.

Initially, uncloaked data 202 (e.g., a data file, or a collection of files) is converted to binary (e.g., bits or bytes) at process stage 204. Thereafter, at process stage 206, an algorithm is applied to the converted file. A primary user-specific cloaking sequence 208, a secondary user-specific cloaking sequence 210, and the converted data 202 itself are applied as inputs to the algorithm. In some embodiments, as noted above, the algorithm applied at stage 206 may correspond to any suitable data obfuscation technique described in U.S. Pat. Nos. 9,639,714 or 9,749,302. In other embodiments, the algorithm may be any other algorithm described herein, such as the "offset-insert" or "offset-delete" algorithm discussed below.

At a process stage 212, it is determined whether all cloaking layers have been applied. If only one layer is to be applied, for example, then the answer is "yes" after the first iteration of process stage 206. If all cloaking layers were applied, the cloaking algorithm is complete, with the cloaked data 214 residing in persistent memory. If one or more cloaking layers still need to be applied, however, flow proceeds to process stage 216, where the integer n (which is equal to one at the start of algorithm 200) is incremented by one. Process stage 206 then repeats for the n-th cloaking layer. FIG. 2 depicts an embodiment in which at each successive iteration of stage 206 the algorithm uses (as inputs) the same primary cloaking sequence 208, but an n-th secondary cloaking sequence. In other embodiments, however, both the primary and the secondary cloaking sequence are different at each iteration. For example, the cloaking sequence 208 may be the n-th primary user-specific cloaking sequence, and the cloaking sequence 210 may be the n-th secondary user-specific cloaking sequence. For multilayer cloaking embodiments it is understood that, while FIG. 2 shows the converted data 202 being input to stage 206, for subsequent layers it is instead the already-cloaked data (i.e., cloaked n−1 times) that is input to the algorithm at stage 206. Thus, for example, once-cloaked data would be input to the algorithm during a second iteration of stage 206, and twice-cloaked data would be input to the algorithm during a third iteration of stage 206, etc.

Figure 3:
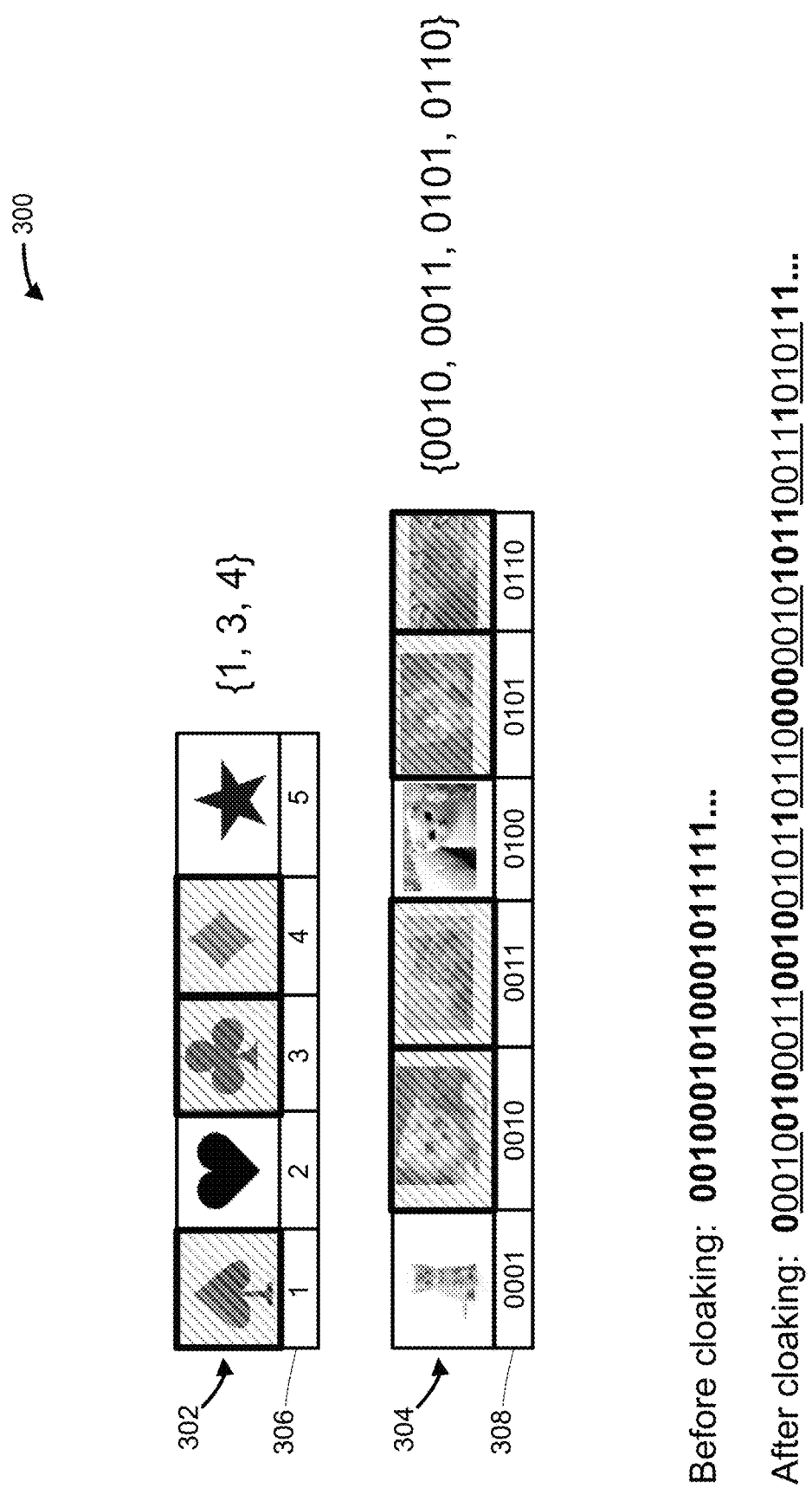
FIG. 3 depicts an example scenario corresponding to a first embodiment of an algorithm for cloaking data based on user-specific cloaking sequences.

FIG. 3 depicts an example scenario 300 corresponding to a first embodiment of an algorithm for cloaking data based on user-specific cloaking sequences. The algorithm described in connection with FIG. 3 (or the algorithms described below in connection with FIG. 4 or 5) may be applied at stages 104 and 112 of the process 100 in FIG. 1, for example, and/or may correspond to stage 206 of the algorithm 200.

In FIG. 3, user-selected (or user-assigned) images are depicted with shading, while non-selected (or non-assigned) images are depicted without shading. Moreover, for this particular example, it is assumed that the user selected the shaded images in left-to-right fashion (e.g., the spade before the club, and the club before the diamond). Thus, in the scenario 300, the primary cloaking sequence 302 selected from the first image set is "spade, club, diamond," while the secondary cloaking sequence 304 selected from the second image set is "second kitten, third kitten, fifth kitten, sixth kitten."

FIG. 3 also depicts the hidden values that are associated with each image (e.g., values and associations that may be stored in the crypt). In particular, values 306 are offset positions (e.g., positive or non-negative integers) associated with images of the first image set, while values 308 are bit sets associated with images of the second image set. Thus, in this example, the selected primary cloaking sequence 302 is associated with the hidden primary sequence {1, 3, 4} and the selected secondary cloaking sequence 304 is associated with the hidden secondary sequence {0010, 0011, 0101, 0110}. In other embodiments and/or scenarios, different values may be associated with the various images, or the bit sets may include more or fewer bits, etc.

The associations shown in FIG. 3 may be entirely unknown to the user. For example, an application that allows the user to select the cloaking sequences 302, 304 may never display the corresponding hidden sequences to the user. Moreover, as discussed elsewhere herein, the hidden value associations may change from time to time, causing the hidden sequence associated with a given user-selected cloaking sequence to change without the user's knowledge. For example, if the hidden values 306 change from {1, 2, 3, 4, 5} to {4, 1, 2, 5, 3}, the hidden sequence with which primary cloaking sequence 302 ("spade, club, diamond") is associated changes from {1, 3, 4} to {4, 2, 5}, without the user's knowledge.

FIG. 3 also shows an example portion of data, before and after cloaking, for the depicted cloaking sequences and associations when implementing a first embodiment of a cloaking algorithm, referred to herein as the "offset-insert algorithm." The offset-insert algorithm may be applied after a particular file is converted to a binary format (e.g., to bits, bytes, etc.), for example. Generally, the offset-insert algorithm advances through the binary data using the (hidden) offset values, and at each offset position inserts a corresponding one of the bit sets. For the hidden sequences of FIG. 3, for example, the algorithm advances to the second bit (i.e., at an offset position of "1" relative to the start of the uncloaked data) and there inserts the first bit set (0010), as shown by the first four underlined bits in FIG. 3. Because the next offset value is "3," the algorithm then advances (relative to the end of the inserted 0010 bit set) another three bits, and there inserts the second bit set (0011). Thereafter, because the next offset value is "4," the algorithm advances (relative to the end of the inserted 0011 bit set) another four bits, and there inserts the third bit set (0101).

The offset-insert algorithm repeatedly cycles through both the offset values of the primary hidden sequence and the bit sets of the secondary hidden sequence. In embodiments and/or scenarios where the two hidden sequences have unequal numbers of elements, however, there may be a shifting correspondence between the offset values and bit sets. For example, in the depicted situation with three offset values and four bit sets, the fourth bit set may correspond to the first offset value (on the first pass through the secondary hidden sequence), and the first bit set may correspond to the second offset value (on the second pass through the secondary hidden sequence), etc. This approach is reflected in the cloaked data shown in FIG. 3. In embodiments or scenarios where there are instead more offset values than bit sets, the fourth offset value may correspond to the first bit set (on the first pass through the primary hidden sequence), the first offset value may correspond to the second bit set (on the second pass through the primary hidden sequence), and so on.

To uncloak the cloaked data (e.g., after entering the user's master key, or in order to re-cloak the data with new hidden sequences, etc.), the inverse of the above operations may be performed, using the same associations between cloaking and hidden sequences that were used to cloak the data. For example, the uncloaking algorithm advances to the first offset position (i.e., the second bit of the cloaked data), removes the first bit set (0010), advances from that point by the second offset position (i.e., skips another three bits), removes the second bit set (0011), and so on.

In other embodiments, other operations (other than straight insertion) are performed at the offset positions corresponding to the primary hidden sequence. In some embodiments, at a given offset position, a bit-wise or byte-wise operation may be performed on the corresponding bit set from the secondary hidden sequence, and a bit or byte sequence of equal length in the uncloaked data. For example, a NAND operation may be performed, wherein a "1" in the secondary hidden sequence causes the corresponding bit in the uncloaked data to invert, and a "0" in the secondary hidden sequence causes the corresponding bit in the uncloaked data to remain unchanged. Other operations may also be used, so long as the operation can be unambiguously reversed for the uncloaking operation.

Figure 4:
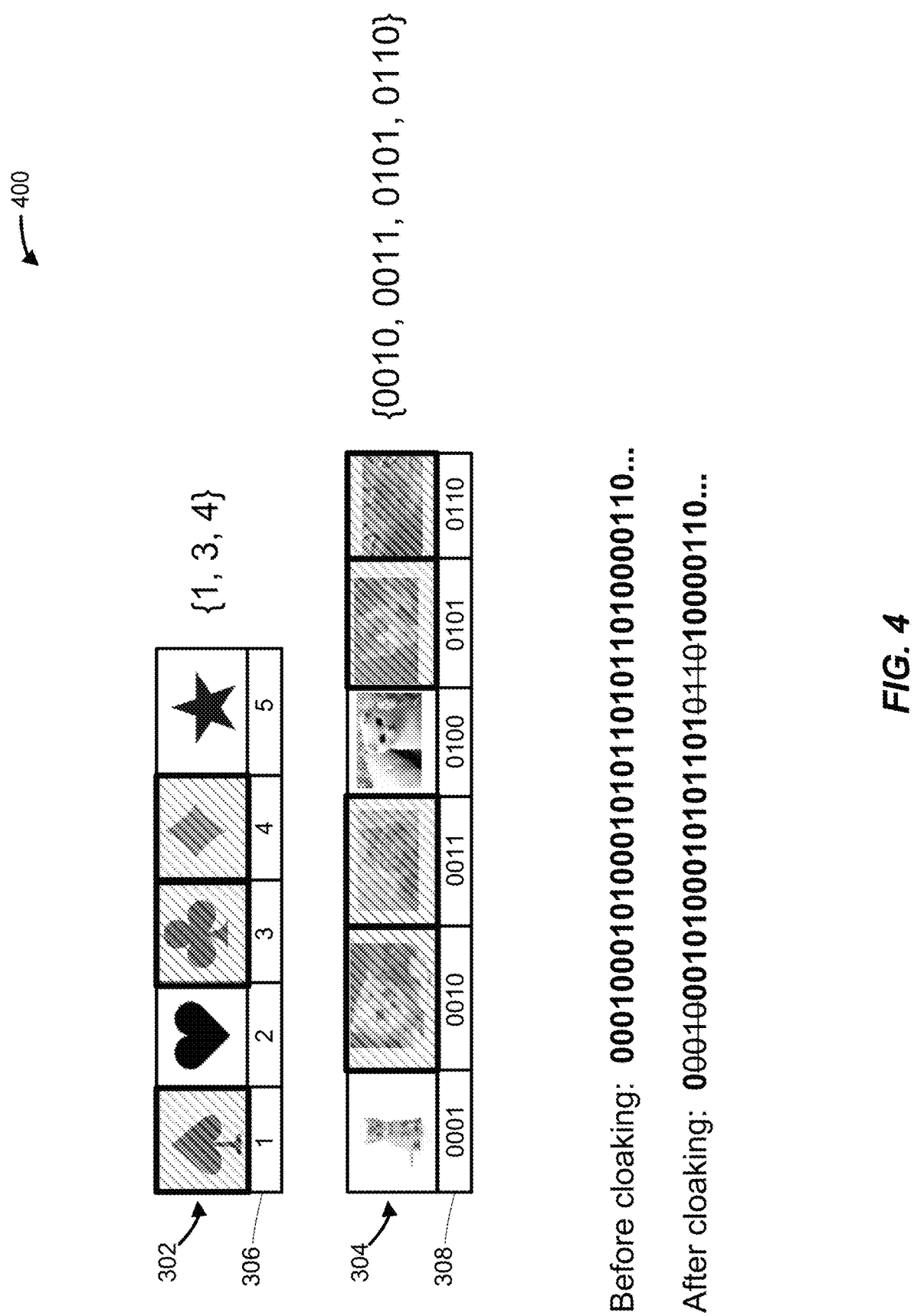
FIG. 4 depicts an example scenario corresponding to a second embodiment of an algorithm for cloaking data based on user-specific cloaking sequences.

In some embodiments, a deletion operation is performed at the specified offset positions, as shown in the example scenario 400 in FIG. 4. FIG. 4 assumes the same primary and secondary cloaking sequences 302, 304, and the same associated hidden values 306, 308, as in FIG. 3. In the algorithm of FIG. 4 (referred to herein as the "offset-delete algorithm"), however, bits are selectively deleted rather than inserted.

As with the offset-insert algorithm, the offset-delete algorithm may be applied after a particular file is converted to a binary format. Generally, the offset-delete algorithm advances through the binary data using the (hidden) offset values, and at each offset position deletes a sequence of four bits if and only if those four bits match a corresponding one of the hidden sequence bit sets. For the hidden sequences of FIG. 4, for example, the algorithm advances to the second bit (i.e., at an offset position of "1" relative to the start of the uncloaked data) and there determines whether the next four bits (0010) match the first bit set (0010). Because they do match, the algorithm deletes those four bits from the uncloaked data, as shown by the first four struck-through bits in FIG. 4. Because the next offset value is "3," the algorithm then advances (relative to the end of the deleted bits) another three bits, and there determines whether the next four bits (0100) match the second bit set (0011). Because they do not match, the algorithm leaves those four bits from the uncloaked data untouched. Thereafter, because the next offset value is "4," the algorithm advances (relative to the end of the 0100 bit pattern) another four bits, and there determines whether the next four bits (0110) match the third bit set (0101). Because they do not match, the algorithm also leaves those four bits from the uncloaked data untouched. Thereafter, the algorithm cycles back to the first offset value ("1"), and therefore advances (relative to the end of the 0110 bit pattern) another bit, and there determines whether the next four bits (0110) match the fourth bit set (0110). Because they do match, the algorithm deletes those four bits from the uncloaked data, and so on.

As with the offset-insert algorithm, the offset-delete algorithm repeatedly cycles through both the offset values of the primary hidden sequence and the bit sets of the secondary hidden sequence. While the example shown in FIG. 4 has more bit sets than offset values, it is understood that there may be more offset values than bit sets (causing the algorithm to cycle through bit sets more frequently than offset values), or that there may be an equal number of offset values and bit sets.

To allow the cloaked data to be uncloaked, it is necessary to generate and store some indication of whether data was deleted at each offset position. Thus, for example, a computer implementing the algorithm may also generate metadata (e.g., in a header of a cloaked file, or in a separate file) that includes such information. For example, a header or separate file may include a bit sequence with a binary value for each offset position within the cloaked data (e.g., with "1" indicating that bits were deleted at that offset position, and with "0" indicating that no bits were deleted at that offset position). The metadata itself may be cloaked (e.g., using an offset-insert algorithm and the same hidden sequences, and/or using different hidden sequences, etc.), in some embodiments, to further increase the difficulty of deciphering the cloaked data. In some embodiments, the metadata is included in a separate file stored in the crypt, and is only sent to a local computer (i.e., a computer coupled to the storage device) when needed to uncloak one or more files.

To uncloak the cloaked data (e.g., after entering the user's master key), the inverse of the above operations may be performed, using the same associations between cloaking and hidden sequences that were used to cloak the data, and using the metadata to learn where bits were, and were not, deleted and need to be re-inserted. For example, the uncloaking algorithm advances to the first offset position (i.e., the second bit of the cloaked data), determines from the metadata that the first bit set (0010) was deleted and, in response to that determination, inserts the first bit set. The uncloaking algorithm then advances to the next offset position, determines from the metadata that the second bit set (0011) was not deleted and therefore does not insert the second bit set, and so on.

Figure 5:
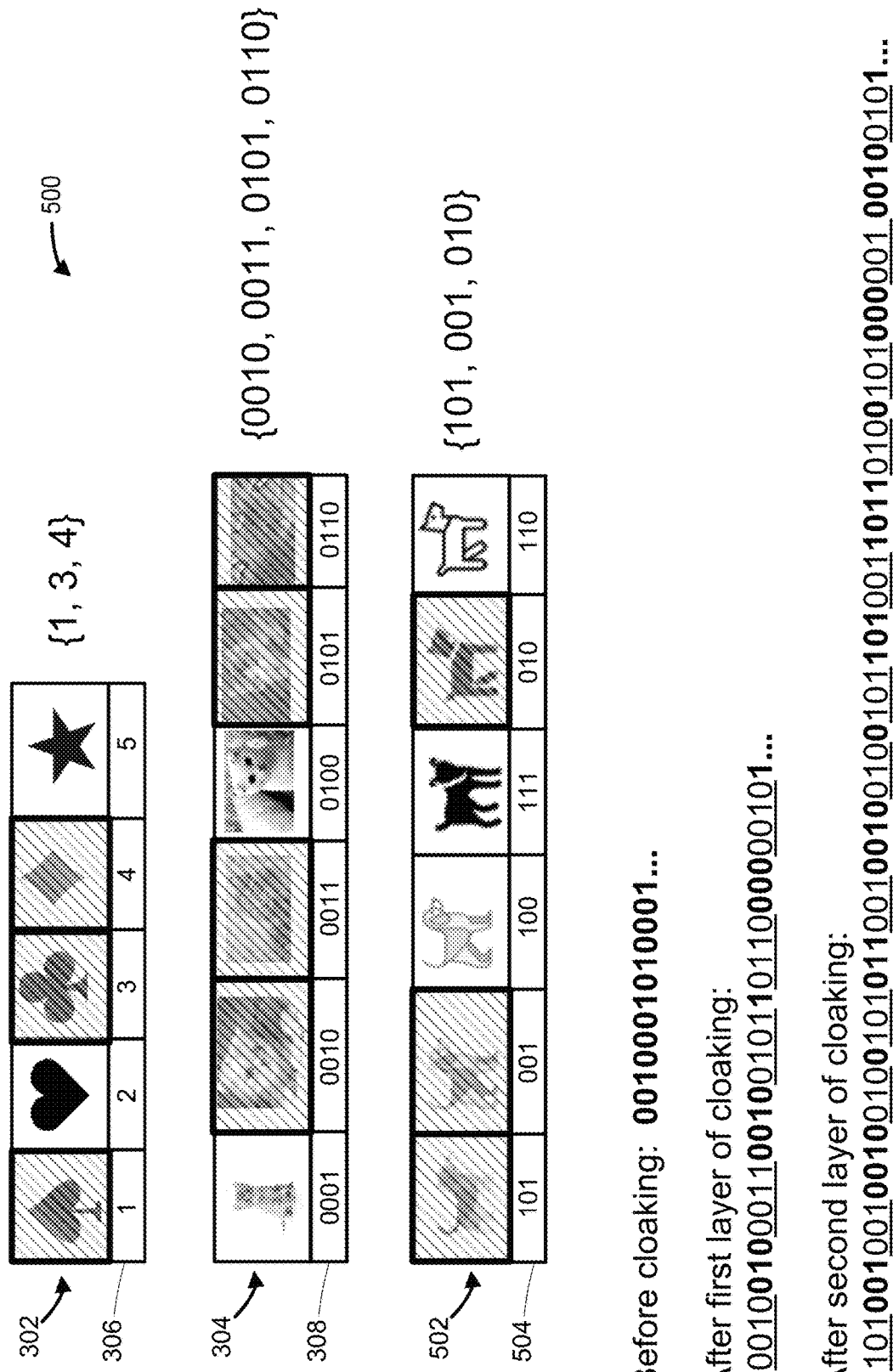
FIG. 5 depicts an example scenario corresponding to a third embodiment of an algorithm for cloaking data based on user-specific cloaking sequences.

In some embodiments, one or more additional layers of cloaking may be applied, e.g., as discussed above in connection with FIG. 2, and as shown in an example scenario 500 in FIG. 5. FIG. 5 assumes the same primary and secondary cloaking sequences 302, 304, and the same associated hidden values 306, 308, as in FIG. 3. In the algorithm of FIG. 5, however, a third cloaking sequence 502 is associated with hidden values 504.

As with the algorithms of FIGS. 3 and 4, cloaking may be applied after a particular file is converted to a binary format. The primary cloaking sequence 302 and second cloaking sequence 304 may be used to initially cloak the sequence as discussed above, e.g., using the offset-insert algorithm or the offset-delete algorithm. While other operations may instead be used, FIG. 5 depicts an embodiment in which the first layer of cloaking (using the hidden sequences associated with cloaking sequences 302, 304) uses an offset-insert algorithm.

After the first layer of cloaking is complete, a second layer of cloaking is applied to the once-cloaked data. In the embodiment of FIG. 5, this is accomplished by using cloaking sequence 302 and cloaking sequence 502 to apply the offset-insert algorithm to the once-cloaked data, e.g., with the hidden values associated with cloaking sequence 302 supplying the offset values and the hidden values associated with cloaking sequence 502 supplying the bit sets for insertion. FIG. 5 shows the output/result of both the first and the second layer of cloaking, for this particular embodiment and scenario.

To uncloak the cloaked data (e.g., after entering the user's master key), the inverse of the above operations may be performed, using the same associations between cloaking and hidden sequences that were used to cloak the data, and using the inverse of the ordering of layers (i.e., first uncloaking the cloaked data using the hidden values corresponding to cloaking sequences 302 and 502, and then uncloaking the partially uncloaked data using the hidden values corresponding to cloaking sequences 302 and 304).

In other embodiments, other numbers of layers (e.g., four, five, ten, etc.) may be used, and/or different algorithms may be applied at different layers (e.g., offset-insert and then offset-delete, to keep file sizes more manageable). Moreover, in some embodiments, different offset value sequences may correspond to different layers. In FIG. 5, for example, a fourth cloaking sequence could be associated with a hidden sequence of offset values (e.g., different than the offset values corresponding to primary cloaking sequence 302), and the second layer of cloaking may be accomplished by using the offset values associated with that fourth cloaking sequence, as well as the bit sets associated with the third cloaking sequence 502.

Figure 6:
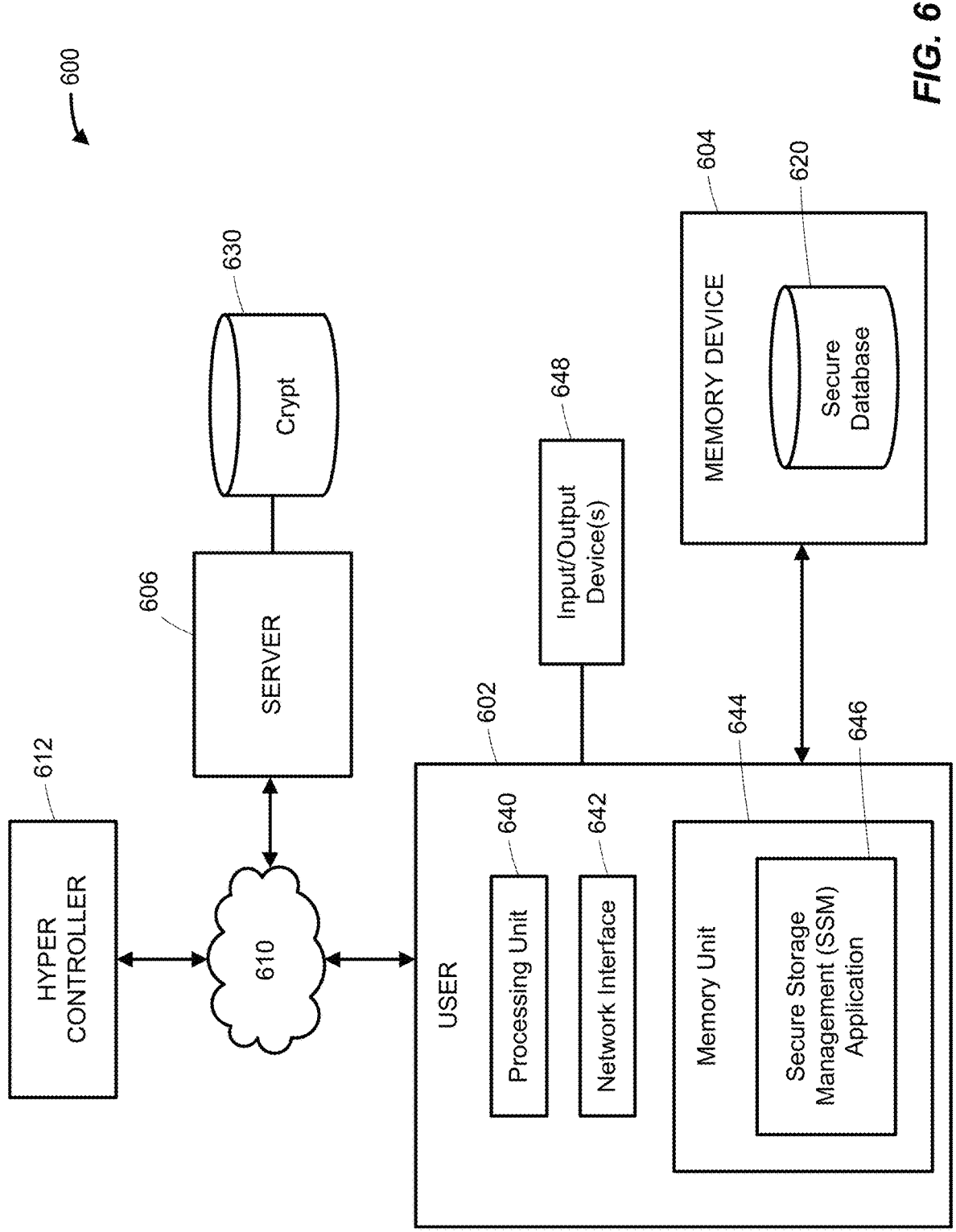
FIG. 6 is a block diagram of an example system in which aspects of the present disclosure may be implemented, according to one embodiment.

FIG. 6 is a block diagram of an example system 600 in which aspects of the present disclosure may be implemented, according to one embodiment. As seen in FIG. 6, system 600 includes a user computer 602, a memory device 604, a server 606 communicatively coupled to user computer 602 via a network 610, and a hyper controller computer 612 communicatively coupled to at least server 606 (and possibly also user computer 602) via network 610.

Generally, as will be seen from the below description, user computer 602 is used by a user to manage secure storage of his or her files/data, while hyper controller computer 612 provides one or more other individuals with higher-level privileges relating to secure storage. While FIG. 6 depicts only one user computer 602 with one corresponding memory device 604, it is understood that system 600 may include multiple other user computers communicatively coupled to server 606 and/or hyper controller computer 612. For example, user computer 602 may be the personal computer of a single employee of a company, while hyper controller computer 612 may be a server or other computer of an information technology (IT) department of the company.

User computer 602 may be a desktop computer, a laptop computer, a tablet, a mobile device (e.g., a smartphone), or any other suitable computing device (or collection of coupled computing devices, such as a thin client device coupled to a remote server). Memory device 604 is a memory device (or, in some embodiments and/or scenarios, a collection of memory devices) containing persistent memory and communicatively coupled to, or integrated within, user computer 602. For example, memory device 604 may include a hard drive within user computer 602, a solid state memory within user computer 602, a memory stick that physically and electrically connects to a port/input of user computer 602 (e.g., a USB flash memory, a memory card, or an external hard drive, etc.), an external device having a short-range wireless connection to computer 602 (e.g., a Bluetooth-enabled device), and/or any other suitable type of device or devices containing persistent memory.

Memory device 604 stores a secure database 620, which contains the user data that is cloaked. In some embodiments and/or scenarios, memory device 604 also stores the data in its uncloaked form at certain times (e.g., prior to cloaking, and/or when the user has entered his/her master key to view or transfer the cloaked data, etc.). Database 620 may be a relational database (e.g., of an SQLite database management system), for example. If memory device 604 includes multiple devices, database 620 may be distributed among those different devices. The contents and structure of database 620 are discussed in further detail below, according to various embodiments.

Server 606 is communicatively coupled to (e.g., includes) a memory (or memories) storing a "crypt" 630, which is a highly secure database storing various pieces of information for managing the cloaking and uncloaking of user data. For example, crypt 630 may store the master key and cloaking sequences for the user of computer 602, and possibly also for a number of other users. Crypt 630 also stores the hidden sequences currently associated with the user-specific cloaking sequences (or, the associations/mappings that allow those hidden sequences to be re-created), which may change over time without the knowledge of the user of computer 602 as discussed elsewhere herein.

In some embodiments, crypt 630 also stores "split delegate" keys that may be jointly used to recover access to a user's cloaked files in the event the user forgets his/her key, or is unavailable (e.g., is terminated by a company utilizing system 600, or becomes incapacitated, etc.). In some embodiments, when a particular master key is created, two or more designated "leaders" will be provided with complementary portions of a split delegate key (e.g., via email messages, or text messages, etc.), either automatically or at the specific request of the user. To uncloak the user's data, all of the designated leaders must provide/enter their respective split delegate keys. In this manner, security is enhanced by the fact that no single individual can gain access to a user's data without the user's consent. The user may indicate that split delegate keys are to be provided to different family members, or to different employees at the user's company, for example. In some embodiments, successful use of the split delegate keys triggers a notification to the user, to prevent undesired use of the split delegate keys without the user's knowledge.

Network 610 may be any suitable communication network or combination of communication networks (wired and/or wireless), such as one or more local area networks (LANs), one or more wide area networks (WANs), etc. In some embodiments, computers 602 and 612 use state of the art encryption and/or authentication techniques to communicate with server 606 (and possibly each other) via network 610. In some embodiments, some or all of the data transferred via network 610 (e.g., from/to computer 602 and/or 612) may be obfuscated using any of the techniques described in U.S. Pat. No. 9,639,714.

Moreover, in some embodiments, some or all of the inputs that are described herein as being entered by a user/individual (e.g., selection of cloaking sequences, selection and/or entry of a master key, selection of a data file for cloaking or uncloaking, etc.) may be made more secure by using any of the techniques described in U.S. Pat. No. 9,749,302.

As noted above, a user (or users) of hyper controller computer 612 may be given privileges not shared by the user of user computer 602. For example, a user of computer 602 may have the ability to create and modify/update a user password, create and modify/update cloaking sequences, create and modify/update the master key, create and/or share split delegate keys, and/or create limited-use (e.g., one-time) keys to share with other users (as discussed further below). Conversely, a user of computer 612 may have the ability to modify the cloaking sequences of other users (including the user of computer 602) without their permission, modify or override the master keys of users without permission, modify or override split delegate keys without permission, revoke the permissions for any user to login and access his/her cloaked data, and/or disable master keys, split delegate keys, and/or limited-use keys for any user.

User computer 602 includes a processing unit 640, a network interface 642, and a memory unit 644 storing a secure storage management (SSM) application 646. Processing unit 640 may be a single processor or include multiple processors (e.g., a central processing unit (CPU) and/or a graphics processing unit (GPU)), and may execute instructions (e.g., stored in memory unit 644) to perform the various operations of computer 602 described below, including the operations of SSM application 646. Memory unit 644 may include one or more non-volatile memories, such as a read-only memory (ROM), and one or more volatile memories, such as a random access memory (RAM). In some embodiments, memory device 604 is, or is included within, memory unit 644 (e.g., if memory device 604 is a hard drive or solid state memory of computer 602).

Network interface 642 includes hardware and/or firmware to support one or more communication protocols suitable for communicating with at least server 606 over network 610 (e.g., an Ethernet port, a wireless local area network card, and/or one or more other communication ports). In some embodiments, network interface 642 includes one or more interfaces specifically configured to support highly secure communication protocols (e.g., handshaking, authentication, encryption/decryption, etc.).

User computer 602 is also communicatively coupled to, and/or includes, one or more input and output devices 648. For example, device(s) 648 may include a hardware keypad with a number of physical keys, as well as any underlying hardware and/or firmware (e.g., contacts, switches, etc.) needed to sense key entries. In some embodiments, device(s) 648 also includes a display screen and/or one or more other (e.g., audio) output components. The output component of device(s) 648 may be integrated with the input component of device(s) 648. For example, device(s) 648 may include a touchscreen. As noted above, user inputs made via device(s) 648 may be made secure using any suitable technique described in U.S. Pat. No. 9,749,302.

In some embodiments, system 600 is arranged differently than shown in FIG. 6, includes one or more devices or other components not shown in FIG. 6, and/or omits one or more device or other components that are shown in FIG. 6. For example, system 600 may not include hyper controller computer 612, and the functionality of hyper controller computer 612 may instead be provided by server 606. As another example, at least some of the functionality of SSM application 646 may instead be provided by accessing a web server (possibly server 606) using a web browser application stored in memory unit 644 and executed by processing unit 640.

The operation of system 600 will now be discussed with reference to FIGS. 7 through 9, according to various embodiments. While the below discussion refers at times to the components of system 600, it is understood that the various aspects of the invention described herein may instead be implemented within other types of systems.

FIGS. 7A through 7F depict screens of an example user interface that may be provided to the user of user computer 602 (e.g., via a display of device(s) 648). As the term is used herein, a "user interface" may include only a single display screen (e.g., a fixed set of information fields, virtual/interactive controls, and/or other elements), or multiple display screens (e.g., different screens generated by SSM application 646, or different web pages provided at a website of a web server, etc.). It is understood that, in other embodiments, the screens depicted in FIGS. 7A through 7F may differ in appearance and/or content, and/or that certain screens may not be generated or presented at all.

Figure 7B:
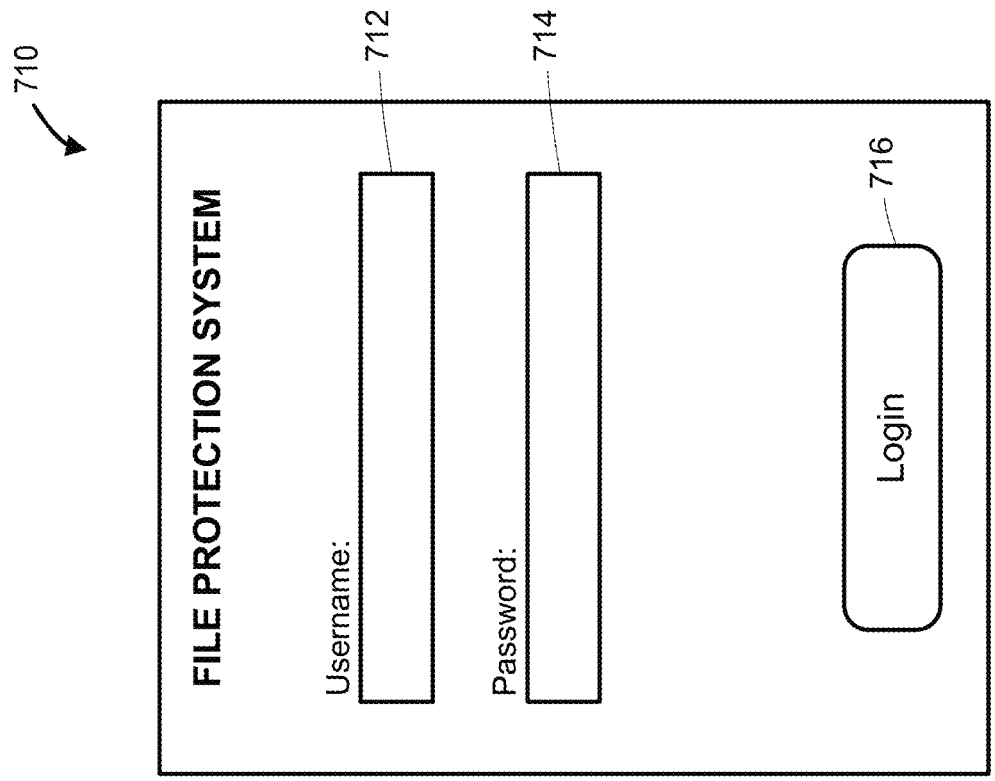
Figure 7A:
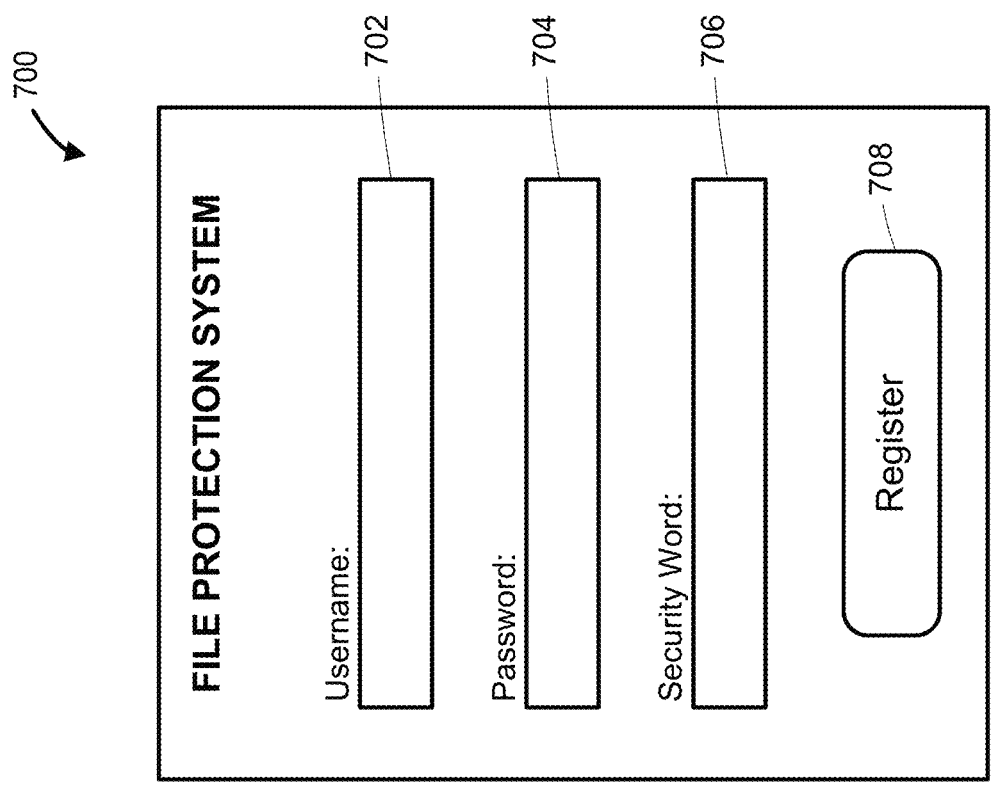

Referring first to FIG. 7A, a screen 700 includes a field 702 for entering/selecting a username (e.g., login), a field 704 for entering/selecting a password, and a field 706 for entering/selecting a security word (e.g., to display to the user for authentication purposes). Screen 700 also includes a control 708. After a first-time user has entered information into fields 702, 704 and 706, he or she activates control 708 to set up a personal account. In response to the user's activation of control 708, SSM application 646 may cause computer 602 to transmit the selected username, password and security word to server 606. Server 606 may then set up an account for the user, e.g., by adding the user's name or other identifier to a list of accounts, and storing the selected username, password and security word in crypt 630, etc. In some embodiments, server 606 sends the user a notification when registration is successful (e.g., by sending an email or text message to the user, or sending a message to computer 602 for display by SSM application 646), or if registration fails (e.g., due to another user having the same username).

Once registered, a user may login via a screen 710 (as seen in FIG. 7B), by entering his/her username (in field 712) and password (in field 714), and activating a control 716. SSM application 646 may prevent user access to its primary features (e.g., features enabling the user to select cloaking sequences and/or browse cloaked files) unless the user enters a recognized (i.e., previously registered) username and password combination via screen 710.

Figure 7C:
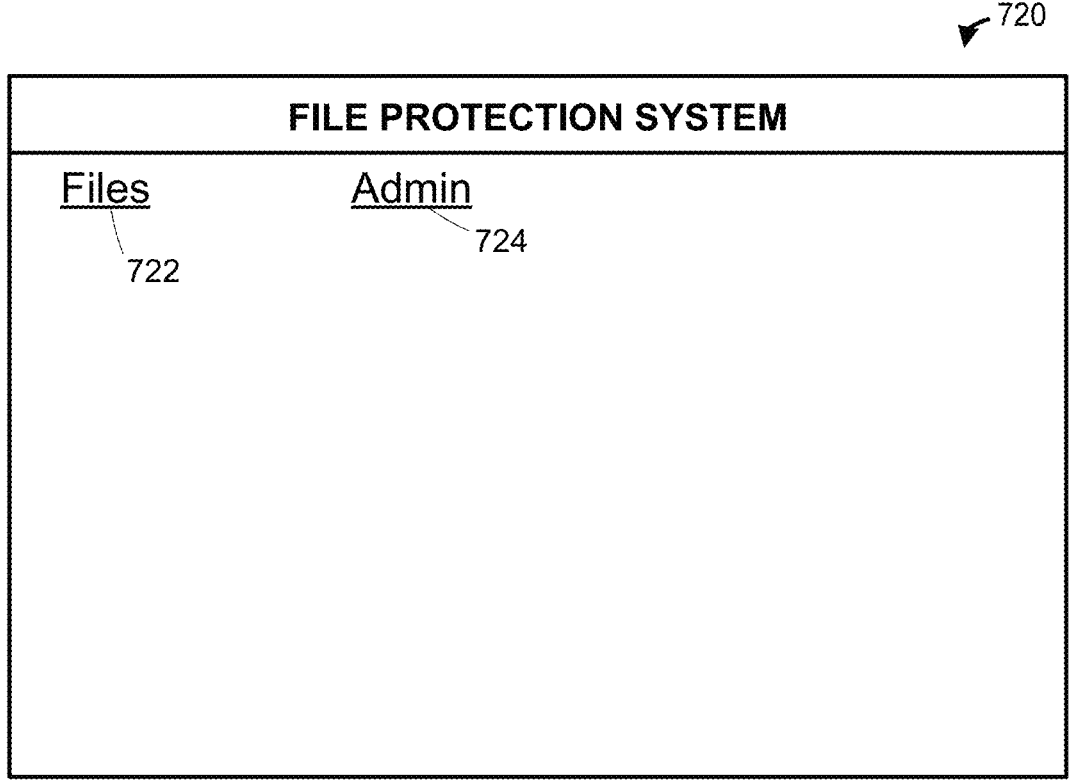

If the correct credentials are entered, SSM application 646 may cause the home screen 720 of FIG. 7C to be presented to the user. In this example embodiment, the user may select a files tab 722 or an admin tab 724. Generally, files tab 722 may enable the user to select which files are to be cloaked, and/or browse cloaked files, while admin tab 724 may enable the user to select cloaking sequences that dictate how those files are cloaked.

Figure 7D:
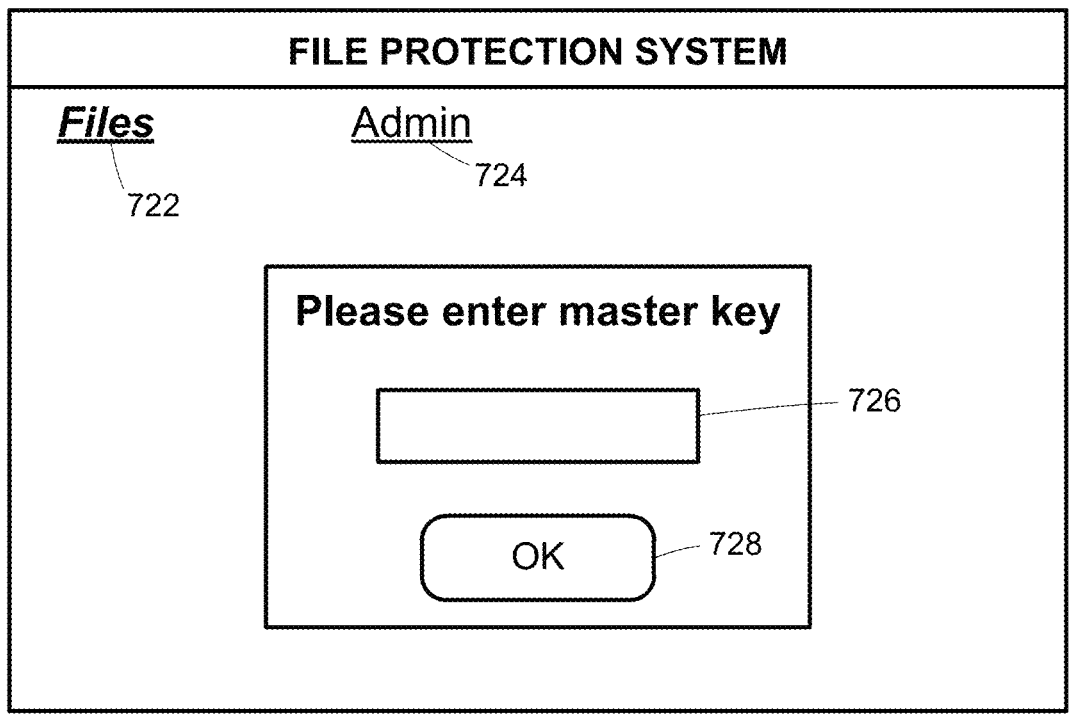

If the user selects the files tab 722, SSM application 646 may cause the screen 730 of FIG. 7D to be presented to the user. Screen 730 prompts the user to enter his/her master key in a field 726. Once the user enters the correct master key in field 726 (and activates control 728), SSM application 646 may cause screen 740 of FIG. 7E to be presented to the user. If the user has not yet selected a master key, SSM application 646 may cause a prompt for a new master key to be displayed to the user. Alternatively, SSM application 646 may require that the user select a master key via the admin tab 724, as discussed further below in connection with FIG. 7F.

Figures 7E, 7F:
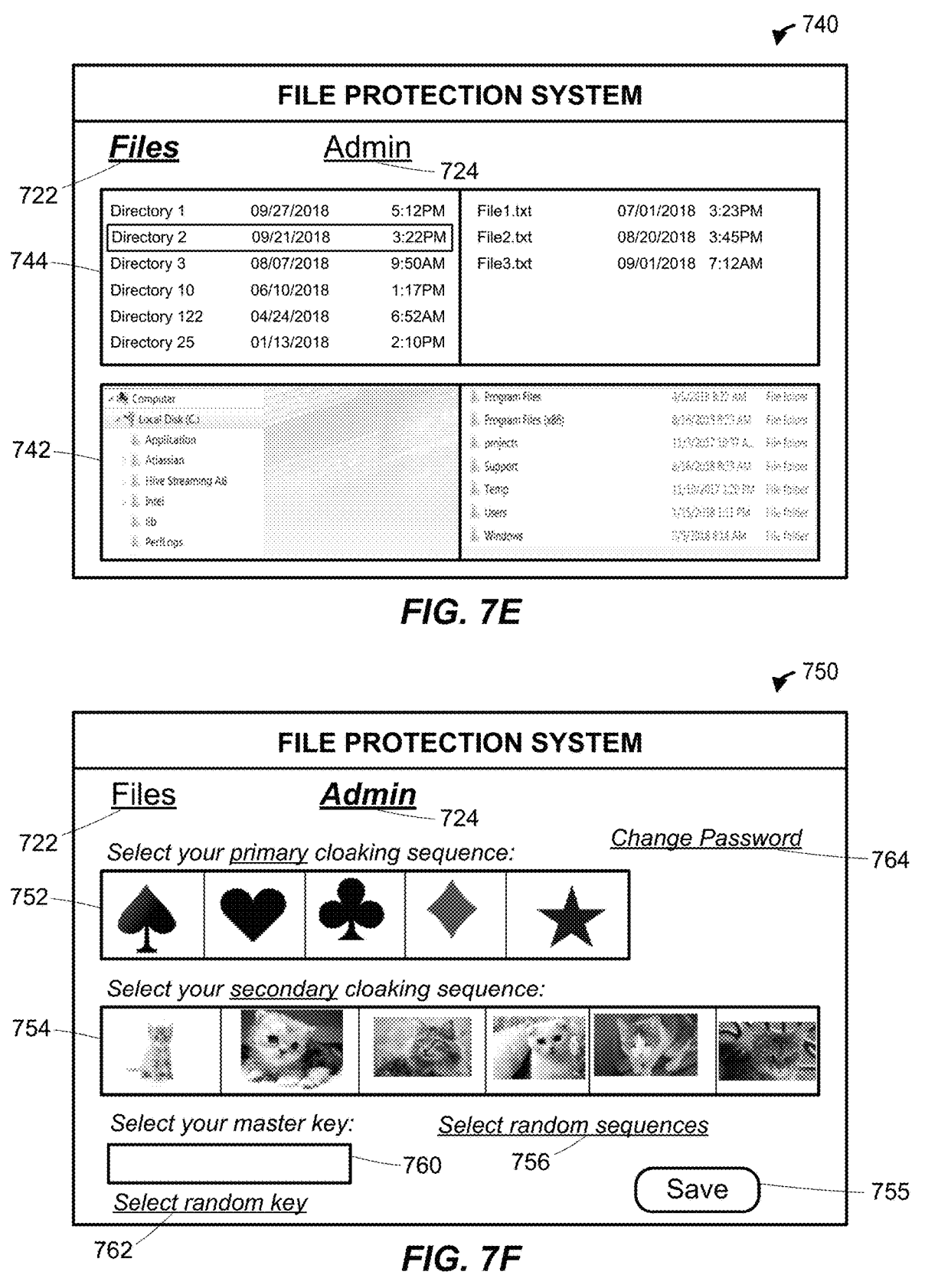

As seen in FIG. 7E, screen 740 may include a file explorer pane 742 and a secure files pane 744 (in this example, bottom and top panes, respectively). Pane 742 may show the local file explorer tree structure (e.g., for all data files stored within memory device 604), while pane 744 may show the files, from among the files that can be seen in pane 742, that are cloaked. In some embodiments, SSM application 646 allows the user to select which files to cloak by dragging one or more directories or files from pane 742 and dropping it/them in pane 744. Further, in some embodiments, SSM application 646 may allow the user to permanently uncloak files, by deleting one or more directories or files from pane 744. In some embodiments, other copy and paste operations (other than drag and drop) may be used to move directories and files between panes 742, 744. Depending on the embodiment, the directories shown in pane 744 may correspond to directories viewable in pane 742. Alternatively, or in addition, the directories shown in pane 744 may be user-created directories that reflect a file storage hierarchy that is only relevant to cloaked files.

In some embodiments, only the contents of files (e.g., the files seen on the right-hand side of pane 744 in FIG. 7E) are cloaked. In other embodiments, file metadata is also cloaked, e.g., such that even file names (and/or directory names) are obscured unless a user of SSM application 646 has entered the correct master key.

If the user selects the admin tab 724 (e.g., on screen 720 or screen 740), SSM application 646 may cause the screen 750 of FIG. 7F to be presented to the user. Screen 750 enables the user to select a primary and secondary cloaking sequence (e.g., the example primary and secondary cloaking sequences described above in connection with FIGS. 2 through 5). In particular, screen 750 includes a first image set 752 and a second image set 754. Each image in sets 752 and 754 is selectable by the user (e.g., by touching or clicking on the image). The order in which the user selects images within set 752 may determine the order/sequence of images for the primary cloaking sequence, and the order in which the user selects images within set 754 may determine the order/sequence of images for the secondary cloaking sequence. If the user selects the second, fourth, and first images (in that order) among image set 752 and the first, third and sixth images (in that order) among image set 754, for example, then the sequence "heart, diamond, spade" may become the primary cloaking sequence for the user and the sequence "first kitten, third kitten, sixth kitten" may become the second cloaking sequence for the user (e.g., after the user activates a save control 755). In some embodiments, SSM application 646 permits the user to select the same image twice within the cloaking sequence (e.g., to give the sequence "star, club, club" for the primary cloaking sequence, or "second kitten, second kitten, fifth kitten" for the secondary cloaking sequence, etc.). SSM application 646 may detect user activation of the save control 755, and in response cause the selected cloaking sequences to be sent to server 606 for storage in crypt 630.

The total number of images to select for a given sequence may be fixed (e.g., always three images for each of the primary and the secondary cloaking sequence, or four for the former and six for the latter, etc.), either for all users or on a per-user basis (e.g., at the direction of a hyper controller). Alternatively, in some embodiments, each user can pick any desired number of images for one or both cloaking sequences (e.g., subject to upper and/or lower limits, such as requiring at least three and no more than five images per cloaking sequence, etc.), based on the level of security the user would like for a particular file or file set.

In the embodiment of FIG. 7F, screen 750 also includes a control 756 that allows the user to select randomly generated sequences. For example, if SSM application 646 detects that the user has activated control 756, SSM application 646 may generate a first pseudo-random sequence from among image set 752 and a second pseudo-random sequence from among image set 754. Screen 750 also includes a field 760 in which a user can enter a master key (e.g., for the first time, or possibly to modify an existing master key). The master key may be a fixed length or a configurable length (e.g., per-user as set by a hyper controller), and may be numeric or alphanumeric. Similar to control 756, a control 762 may allow the user to instead select a randomly generated master key. For example, if SSM application 646 detects that the user has activated control 762, SSM application 646 may generate a pseudo-random master key. As seen in FIG. 7F, screen 750 may also include other controls or fields, such as a control 764 to change the user's password.

When a new cloaking sequence (or sequences), and/or a new master key, has been selected, and save control 755 activated, SSM application 646 may cause the sequence(s) and/or master key to be sent to server 606 for storage in crypt 630, in association with the account (e.g., username) of the user. SSM application 646 may also trigger a re-cloaking of cloaked data in memory device 604 whenever a user changes one or more cloaking sequences.

It is understood that screen 750 is just one of many possible embodiments. For example, the images in sets 752, 754 may be any other kinds of images (preferably, images for which the distinctions are easy to remember), or may be other elements such as numbers and/or letters. As another example, screen 750 may include one or more additional image sets similar to sets 752, 754, to allow the user to select a third (and possibly fourth, etc.) cloaking sequence for additional layers of cloaking, as discussed above. In some embodiments, the user can choose how many cloaking sequences to select, within some preconfigured limits, in order to tailor the level of security based on the sensitivity of his or her data. In other embodiments, a hyper controller determines how many cloaking sequences the user must select, or provides the upper and/or lower bounds on the number of cloaking sequences the user can select, based on the security level desired for that particular user. For example, a user of hyper controller computer 612 may configure the number of sequences (or bounds/limits on the number of sequences) using a software application executing on computer 612, and the software application may cause that information to be transmitted to computer 602 via network 610. SSM application 646 may receive that information, and configure screen 750 in accordance with that information (e.g., by presenting a corresponding number of image sets, etc.).

In some embodiments, the user interface provides one or more controls that allow a user to specify whether files should be fully cloaked, or only partially cloaked (i.e., "envelope" cloaking). For structured data, for example, the user interface may provide a control that, if activated (or placed in a particular setting) by the user, causes the structured data to be only partially cloaked. In one such embodiment, SSM application 646 is configured to identify specific fields to be cloaked within the user's files, e.g., based on metadata and/or flags within each file that indicate secure fields.

Additionally or alternatively, in some embodiments, the user interface provides one or more controls that allow a user to indicate that a limited-use key, which allows uncloaking of the user's data only a limited number of times (e.g., once, or five times, etc.), is to be provided to one or more other individuals. If the user so indicates, SSM application 646 may cause the limited-use key to be sent to the other individual(s), e.g., via email, text message, or any other suitable method. In one use case, for example, the "user" of computer 602 is an information technology (IT) department of a company, and limited-use keys for different collections of data are provided to different employees based on their positions and/or clearance levels.

Figure 8:
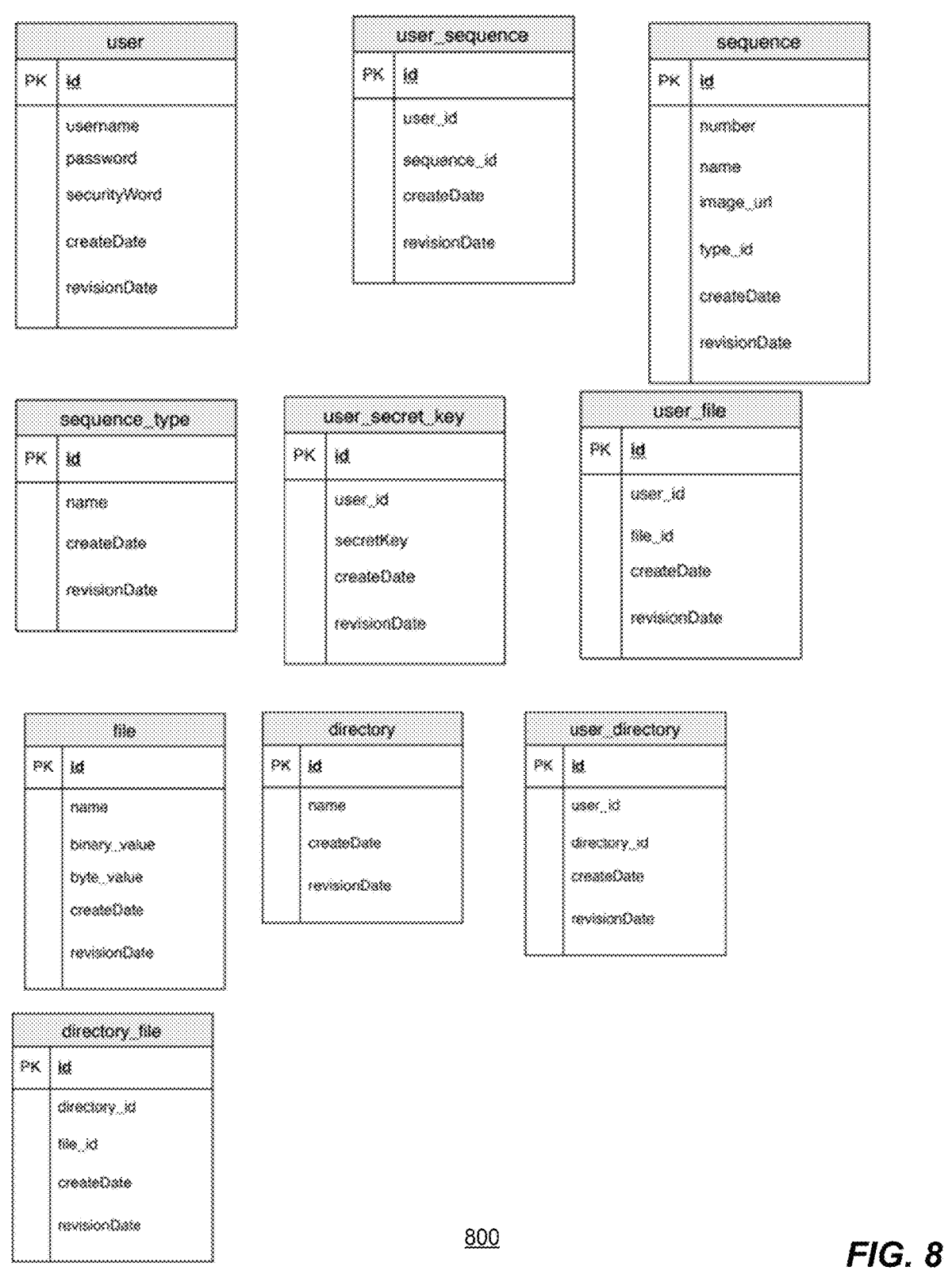

FIG. 8 depicts example database structures 800 that may be implemented in the system 600 of FIG. 6. More specifically, crypt 630 of FIG. 6 may store data utilizing database structures 800, in one embodiment.

In the database structure 800, each box represents a table that may be stored in crypt 630, with the top line of each box being the table name (e.g., "user," "user_sequence," etc.). The tables are linked using primary keys, each of which is denoted in FIG. 8 by the letters "PK." Database structure 800 enables efficient cross-referencing of data items, and permits user and system updates without breaking existing links or requiring extensive updates.

Figure 9A:
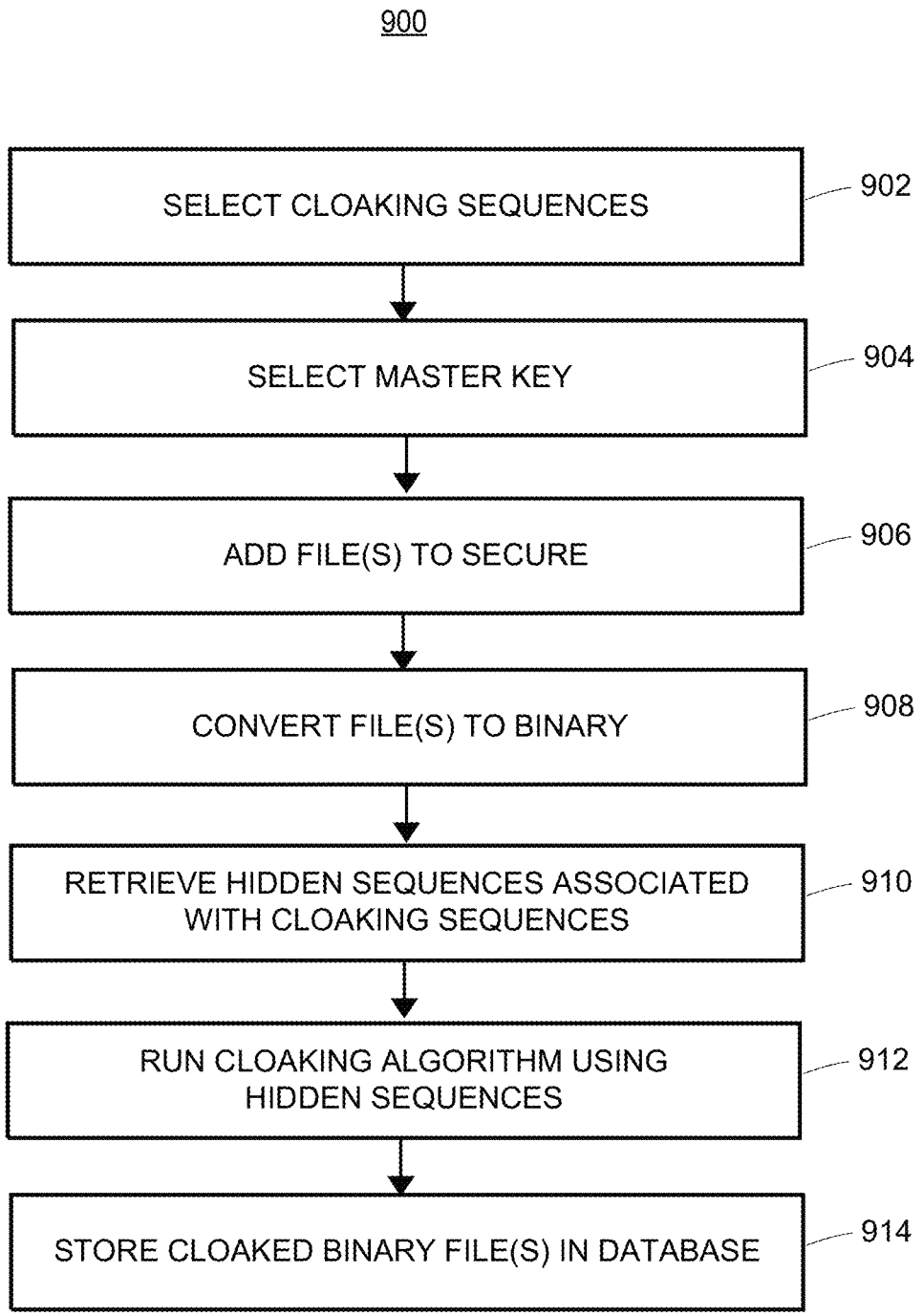
FIGS. 9A through 9D are flow diagrams of example procedures that may be followed within the system of FIG. 6.

FIGS. 9A through 9D are flow diagrams of example procedures that may be followed within the system 600 of FIG. 6. Referring first to FIG. 9A, in a procedure 900 for a user's first-time setup, the user selects cloaking sequences at block 902 (e.g., via a user interface that displays a screen such as screen 750 of FIG. 7F). The user also selects a master key, at block 904 (e.g., via screen 750).

Thereafter, at block 906, the user adds one or more data files to secure (e.g., via screen 740 of FIG. 7E). The added file(s) is/are then converted to binary format at block 908 (e.g., by SSM application 646). At block 910, hidden sequences associated with the cloaking sequences that were selected by the user at block 902 are retrieved (e.g., by SSM application 646 causing computer 602 to request the hidden sequences from server 606, and server 606 transmitting the hidden sequences to computer 602 after retrieving the appropriate hidden sequences from crypt 630).

At block 912, a cloaking algorithm is run on the file(s) (e.g., by SSM application 646) using the retrieved hidden sequences. The cloaking algorithm may be an offset-insert algorithm, an offset-delete algorithm, or an algorithm that performs some other type of operation at each offset position, for example, and may include one layer of cloaking or multiple layers of cloaking. At block 914, the output(s) of the cloaking algorithm (i.e., the cloaked binary file(s)) is/are stored in secure database 620. Block 914 may occur in parallel with block 912 (i.e., with data being stored as the cloaked file(s) is/are generated), for example.

Figure 9B:
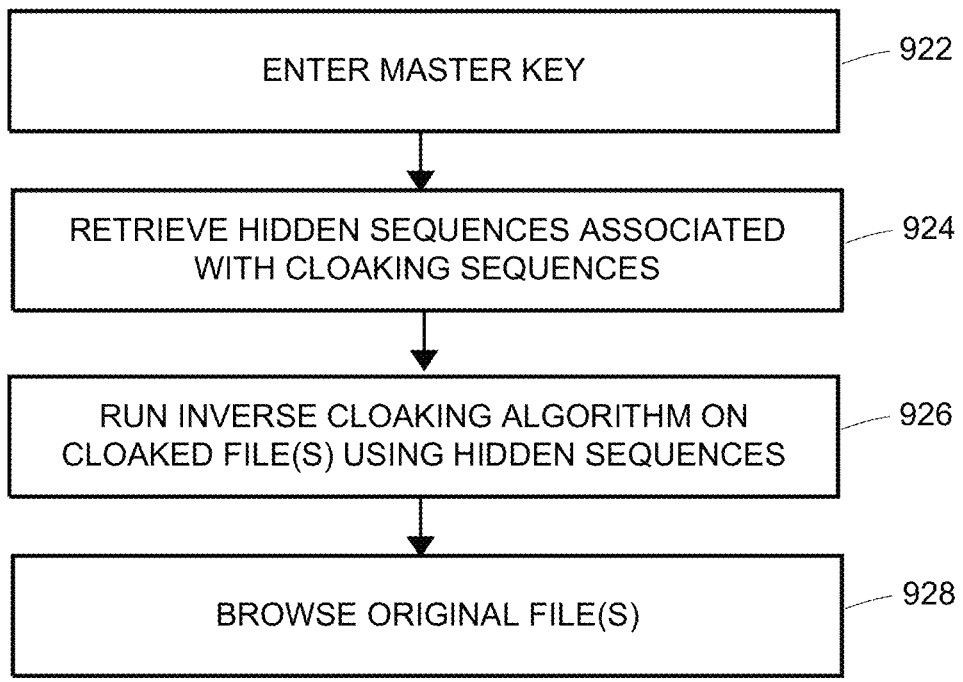

Referring next to FIG. 9B, in a procedure 920 for browsing cloaked files, the user enters his/her master key at block 922 (e.g., via screen 730 of FIG. 7D). Thereafter, hidden sequences associated with cloaking sequences that were previously selected by the user are retrieved (e.g., by SSM application 646 causing computer 602 to request the hidden sequences from server 606, and server 606 transmitting the hidden sequences to computer 602 after retrieving the appropriate hidden sequences from crypt 630).

Next, at block 926, the inverse of the cloaking algorithm that was run at block 912 of FIG. 9A is run (e.g., by SSM application 646) on one or more cloaked files, using the hidden sequences retrieved at block 924. At block 928, the output(s) of the inverse cloaking algorithm (i.e., the uncloaked file(s)) is/are obtained to allow user browsing and/or other operations (e.g., attaching to an email for transmission to another individual). In some embodiments, procedure 920 also includes converting the file(s) from binary format to the original file format.

Figure 9C:
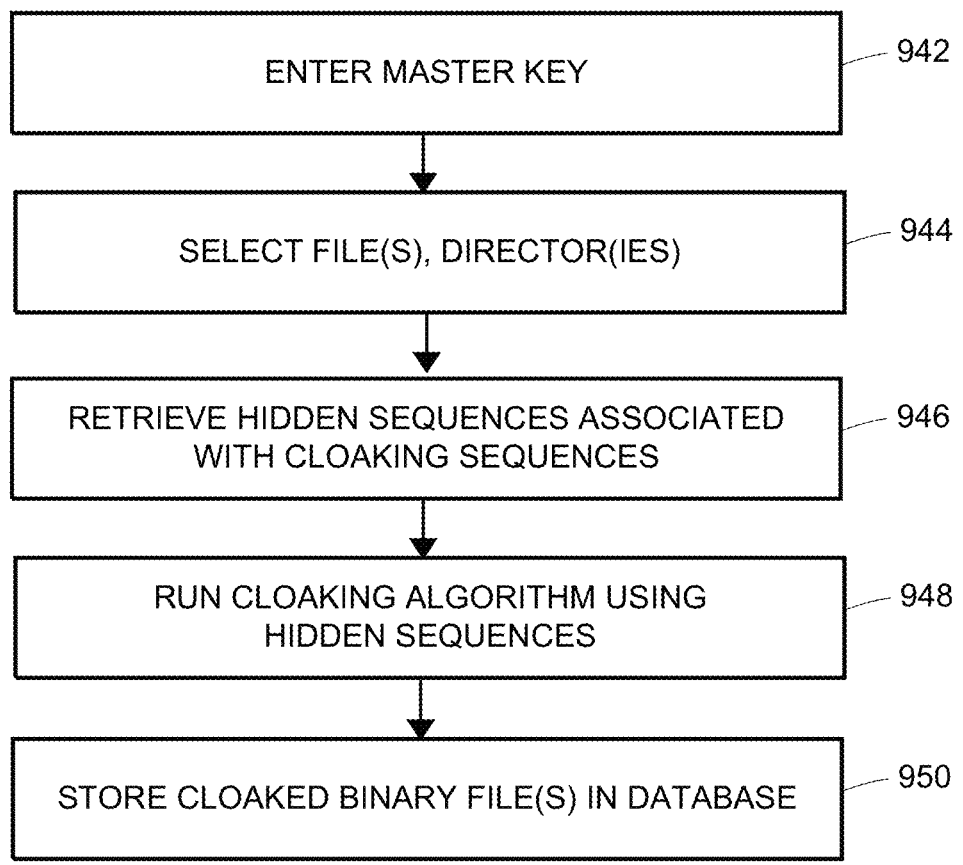

Referring next to FIG. 9C, in a procedure 940 for adding a new file at a later time (i.e., after the first-time setup reflected in procedure 900), the user enters his/her master key at block 942 (e.g., via screen 730). The user also selects one or more files (and/or one or more directories) at block 944 (e.g., via screen 740, by copying or moving files/directories from pane 742 to pane 744). At block 946, hidden sequences associated with the user's cloaking sequences are retrieved (e.g., by SSM application 646 causing computer 602 to request the hidden sequences from server 606, and server 606 transmitting the hidden sequences to computer 602 after retrieving the appropriate hidden sequences from crypt 630).

Next, at block 948, a cloaking algorithm is run on the file(s) (e.g., by SSM application 646) using the retrieved hidden sequences. The algorithm may be the same algorithm used at block 912 of procedure 900, for example. At block 950, the output(s) of the cloaking algorithm (i.e., the cloaked binary file(s)) is/are stored in secure database 620. Block 950 may occur in parallel with block 948 (i.e., with data being stored as the cloaked file(s) is/are generated), for example.

Figure 9D:
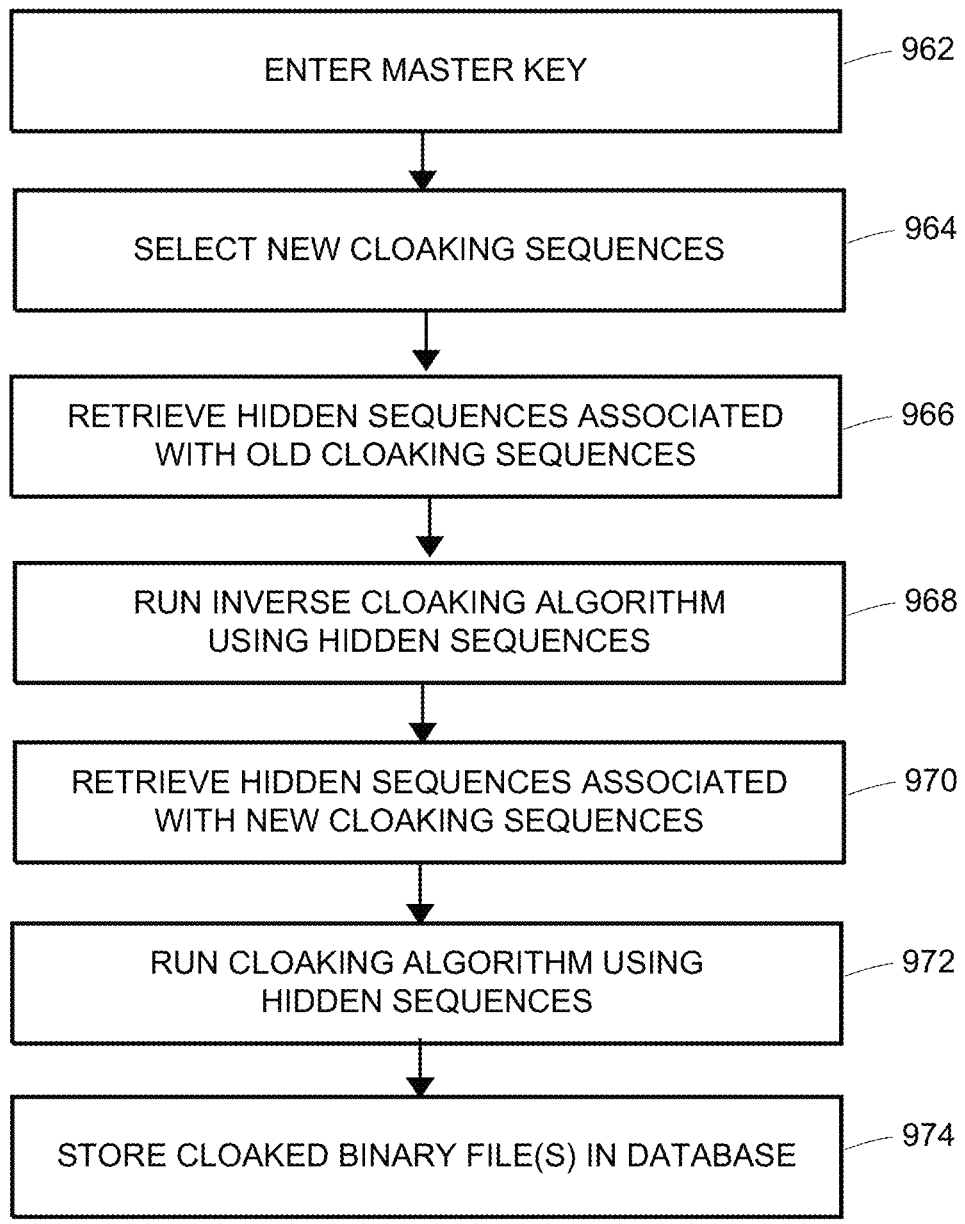

Referring next to FIG. 9D, in a procedure 960 for re-cloaking one or more previously cloaked files when a user changes his/her cloaking sequences, the user enters his/her master key at block 962 (e.g., via screen 730). The user then selects a new set of cloaking sequences at block 964 (e.g., via screen 750). At block 966, hidden sequences associated with the user's previous/old cloaking sequences are retrieved (e.g., by SSM application 646 causing computer 602 to request the hidden sequences from server 606, and server 606 transmitting the hidden sequences to computer 602 after retrieving the appropriate hidden sequences from crypt 630).

Next, at block 968, the inverse of the cloaking algorithm that was run at block 912 of FIG. 9A is run (e.g., by SSM application 646) on one or more cloaked files, using the hidden sequences retrieved at block 966. At block 970, hidden sequences associated with the user's newly selected (at block 964) cloaking sequences are retrieved (e.g., again by SSM application 646 causing computer 602 to request the hidden sequences from server 606, and server 606 transmitting the hidden sequences to computer 602 after retrieving the appropriate hidden sequences from crypt 630). Block 970 may occur simultaneously with block 966, or at a different time.

At block 972, a cloaking algorithm (e.g., the algorithm used at block 912 of procedure 900) is run on the file(s) (e.g., by SSM application 646) using the hidden sequences retrieved at block 970. At block 974, the output(s) of the cloaking algorithm (i.e., the re-cloaked file(s)) is/are stored in secure database 620. Block 974 may occur in parallel with block 972 (i.e., with data being stored as the re-cloaked file(s) is/are generated), for example.

In some embodiments and/or scenarios, a procedure similar to procedure 960 occurs when the user has not changed his/her cloaking sequences, but the hidden values that correspond to those cloaking sequences change. In that case, block 966 may include retrieving the hidden sequences previously associated with the user's cloaking sequences, and block 970 may include retrieving the hidden sequences that are newly associated with the user's cloaking sequences.

Figure 10:
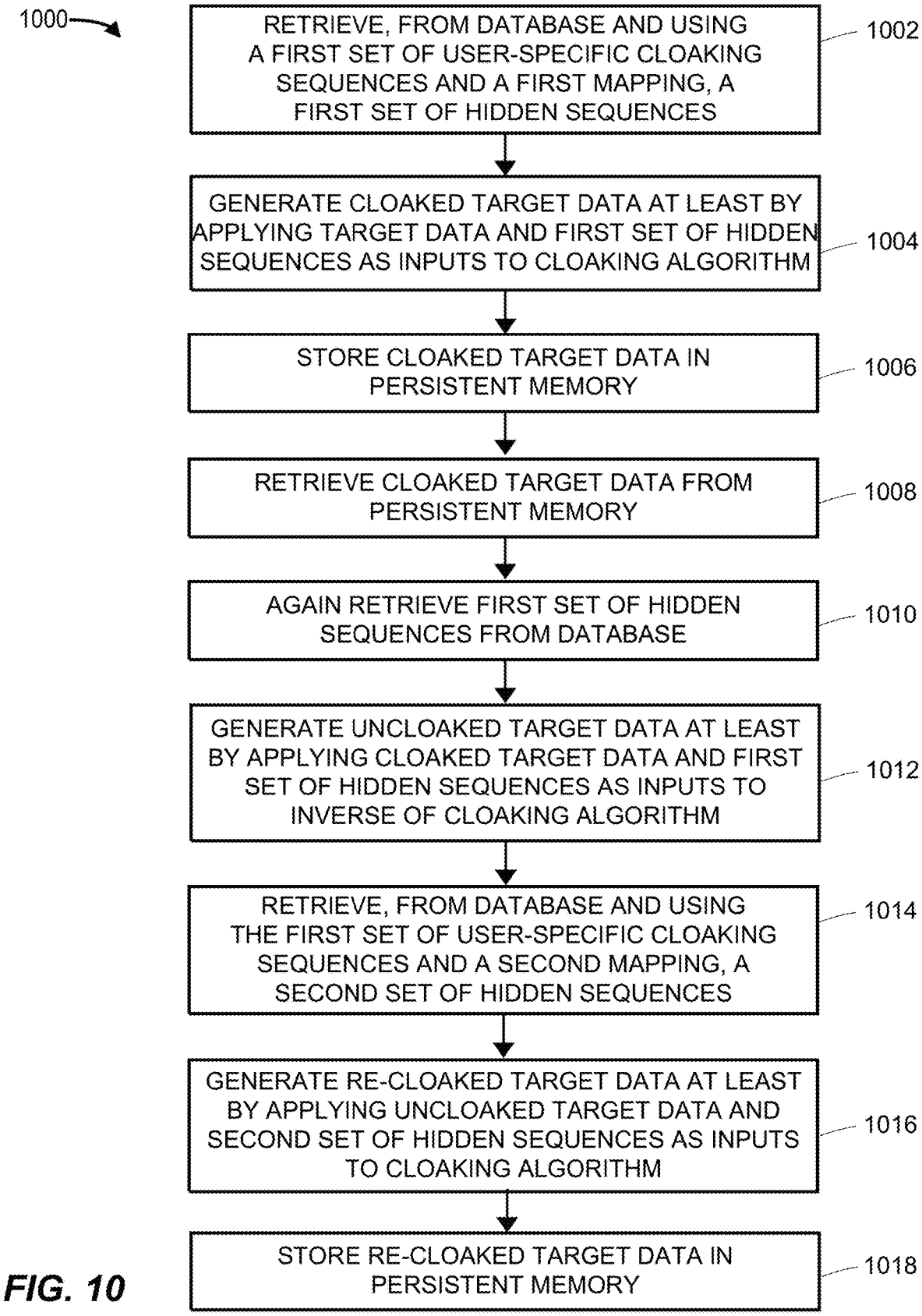
FIG. 10 is a flow diagram of an example method for providing and maintaining secure storage of data.

FIG. 10 is a flow diagram of an example method 1000 for providing and maintaining secure storage of data. The method 1000 may be implemented by computer 602 (e.g., by processing unit 640 when executing SSM application 646), for example.

Blocks 1002 and 1004 occur during a first period of time in which a server (e.g., server 606) provides a first mapping between user-specific cloaking sequence elements and hidden sequence elements. Blocks 1002 and 1004 collectively act to cloak a set of data (referred to as "target data" for purposes of the method 1000), which may include one or more user data files, for example. At block 1002, a first set of one or more hidden sequences is retrieved from a database (e.g., crypt 630) using a first set of one or more user-specific cloaking sequences and the first mapping. For example, one hidden sequence may be retrieved for each different cloaking sequence of the user. The user-specific cloaking sequence(s) is/are specific to the user who owns, or is otherwise associated with, the target data. At block 1004, cloaked target data is generated, at least by applying the target data and the first set of hidden sequences as inputs to a cloaking algorithm. For example, any suitable cloaking algorithm discussed elsewhere herein (e.g., offset-insert, offset-delete, single layered or multilayered, etc.), or in U.S. Pat. Nos. 9,639,714 or 9,749,302, may be used at block 1004. The cloaking may be performed on a bit-by-bit basis, a byte-by-byte basis, or any other suitable basis.

At block 1006, the cloaked target data is stored in a persistent memory (e.g., in secure database 620 of memory device 604). Block 1006 may occur after, or in parallel with, block 1004.

Blocks 1008 through 1016 occur during a later, second period of time in which the server provides a different, second mapping between the user-specific cloaking sequence elements and the hidden sequence elements. Blocks 1008 through 1016 collectively act to re-cloak the cloaked target data. At block 1008, the cloaked target data is retrieved from the persistent memory, and at block 1010, the first set of hidden sequences is once again retrieved from the database (e.g., crypt 630). At block 1012, uncloaked target data is generated, at least by applying the cloaked target data and the first set of hidden sequences as inputs to an inverse of the cloaking algorithm. At block 1014, a different, second set of one or more hidden sequences (e.g., one per user-specific cloaking sequence) is retrieved from the database (e.g., crypt 630) using the first set of user-specific cloaking sequences and the second mapping. At block 1016, re-cloaked target data is generated, at least by applying the uncloaked target data and the second set of hidden sequences as inputs to the same cloaking algorithm that was applied at block 1004.

At block 1018, the re-cloaked target data is stored in the persistent memory (e.g., in secure database 620). Block 1018 may occur after, or in parallel with, block 1016.

In some embodiments, the "target data" consists of data corresponding to a number of data structures within one or more structured data files (rather than the entirety of the files), such that the cloaking and re-cloaking described above results in cloaking and re-cloaking of only a portion of the structured data files. For example, cloaking the target data (at blocks 1002 and 1004) may further include determining that a partial cloaking mode is currently selected (e.g., by the user) and, in response, cloaking only the portion of the structured data files.

The method 1000 may also include other blocks not shown in FIG. 10. For example, the method 1000 may include an additional block at which, during the second time period, an indication that a user has changed the first set of user-specific cloaking sequences to a second set of one or more user-specific cloaking sequences is received (e.g., by receiving a user selection of the cloaking sequence(s) via a graphical user interface). The method 1000 may also include additional blocks in which, in response to receiving that indication, the re-cloaked target data is again re-cloaked, at least by (1) retrieving the re-cloaked target data from the persistent memory (e.g., in secure database 620), (2) again retrieving the second set of hidden sequences from the database (e.g., crypt 630), (3) generating new uncloaked target data at least by applying the re-cloaked target data and the second set of hidden sequences as inputs to the inverse of the cloaking algorithm, (4) retrieving, from the database (e.g., crypt 630) and using the second set of user-specific cloaking sequences and the second mapping, a different, third set of one or more hidden sequences, and (5) generating new re-cloaked target data at least by applying the new uncloaked target data and the third set of hidden sequences as inputs to the cloaking algorithm. In such an embodiment, the method 1000 may further include an additional block in which the new re-cloaked target data is stored in the persistent memory (e.g., in secure database 620).

As another example, the method 1000 may include a first additional block in which a master key entered by the user associated with the target data is received, and a second additional block in which, in response to receiving the master key, the user is provided with access to the re-cloaked target data stored in the persistent memory, e.g., by uncloaking the re-cloaked target data.

As yet another example, the method 1000 may include a first additional block in which a first split delegate key entered by a first person other than the user is received, a second additional block in which a second split delegate key entered by a second person other than the user and the first person is received, and a third additional block in which, in response to receiving at least the first split delegate key and the second split delegate key, access to the re-cloaked target data stored in the persistent memory is provided (e.g., by uncloaking the re-cloaked target data). The method 1000 may also include an additional block in which an electronic notification (e.g., email or text message) is sent to the user in response to the use of the split delegate keys.

Figure 11:
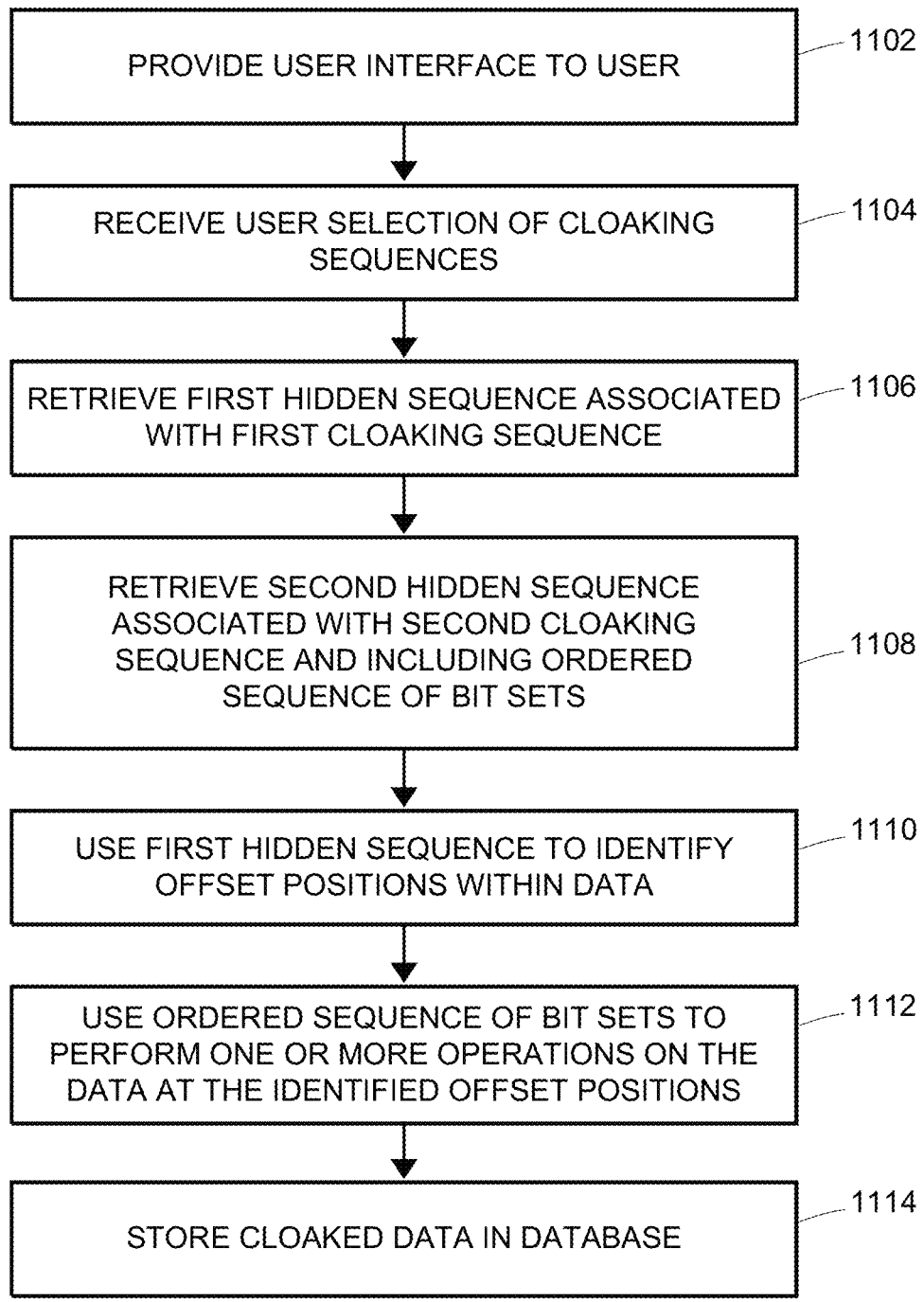
FIG. 11 is a flow diagram of an example method for cloaking data.

FIG. 11 is a flow diagram of an example method 1100 for cloaking data. The method 1100 may be implemented by computer 602 (e.g., by processing unit 640 when executing SSM application 646), for example.

At block 1102, a user interface is provided to a user. For example, a user interface capable of producing some or all of the screens depicted in FIGS. 7A through 7F may be provided.

At block 1104, a user selection of cloaking sequences, including at least first and second cloaking sequences, is received via the user interface. The cloaking sequences may be sequences of user-selected images (e.g., icons, graphics, digital photos, etc.), for example, similar to those shown in FIG. 7F. Alternatively, the cloaking sequences may be sequences of other user-selected elements, such as numbers, letters, words, etc. In some embodiments and/or scenarios, the user manually selects each element (e.g., image) of each cloaking sequence. Alternatively, block 1104 may include receiving, via the user interface, a user request to automatically generate the cloaking sequences (e.g., via control 756 of FIG. 7F), and automatically generating the cloaking sequences in response to the user request.

At blocks 1106 through 1112, data (e.g., one or more files) is cloaked. In some embodiments, the method 1100 includes an additional block (not shown in FIG. 11), occurring prior to block 1106 (or at least, prior to block 1110), in which the data is converted to a binary format (e.g., bits or bytes). Alternatively or additionally, in some embodiments, the method 1100 includes an additional block in which, prior to cloaking the data, the data is uncloaked using cloaking sequences that correspond to a previous selection by the user. In other scenarios, the method 1100 may include an additional block in which, prior to cloaking the data, the data is uncloaked using other hidden sequences that were previously associated with the user's cloaking sequences (e.g., prior to an automatic update implemented by server 606).

Cloaking the data includes, at block 1106, retrieving a first hidden sequence associated with the first cloaking sequence, and at block 1108, retrieving a second hidden sequence associated with the second cloaking sequence. The second hidden sequence includes an ordered sequence of bit sets, with each bit set having one or more bits. The number of bits per bit set may be constant, or may differ between bit sets, depending on the embodiment. The hidden sequences may be retrieved by requesting the sequences from a server (e.g., server 606), for example, and receiving the sequences from the server in response to the request. In some embodiments, block 1108 occurs in parallel with block 1106.

Cloaking the data also includes, at block 1110, using the first hidden sequence to identify offset positions within data. Cloaking the data also includes, at block 1112, using the ordered sequence of bit sets in the second hidden sequence to perform one or more operations on the data at each of the identified offset positions. Block 1112 may occur in parallel with block 1110. The operation(s) may include the insertion of a respective one of the bit sets (e.g., the first bit set at the first offset position), for example, as in the algorithm described above in connection with FIG. 3. In other embodiments, the operation(s) may include "compare and (if match) delete" operations, as in the algorithm described above in connection with FIG. 4.

In some embodiments, cloaking the data also includes applying one or more additional layers of cloaking to the data. For example, the method 1100 may also include retrieving a third hidden sequence (including an additional ordered sequence of bit sets) associated with a third cloaking sequence, and, after block 1112, both (1) using the first hidden sequence to identify offset positions within the (partially cloaked) data, and (2) using the additional ordered sequence of bit sets to perform one or more operations on the (partially cloaked) data at the identified offset positions.

Moreover, in some embodiments, cloaking the data may be in accordance with a user-selected mode (e.g., "partial" or "envelope" cloaking versus "full" cloaking). For example, the method 1100 may include an additional block in which a user selection of an option to only partially cloak the data is received via the user interface, in which case block 1110 may include both (1) identifying a subset of the data that is to be cloaked (e.g., only particular fields of structured data, and/or particular metadata, etc.), and (2) using the first hidden sequence to identify offset positions within that subset of the data.

At block 1114, the cloaked data is stored in a database. For example, the cloaked data may be stored in secure database 620 of FIG. 6. Block 1114 may occur in parallel with blocks 1110 and 1112 (e.g., if data is stored piecemeal as it is being cloaked), for example.

In some embodiments, the method 1100 includes still other blocks not shown in FIG. 11. For example, the method 1100 may include (1) a first additional block in which a user selection of a master key is received (e.g., via the user interface), (2) a second additional block in which, after block 1114, a user entry of the master key is received, (3) a third additional block in which, after the user entry of the master key is received, the cloaked data is uncloaked using at least the first and second cloaking sequence, and (4) a fourth additional block in which at least a portion of the uncloaked data is displayed to the user.

As another example, the method 1100 may include a first additional block in which a user indication of an additional user, to whom limited access to the data is to be provided, is received (e.g., via the user interface), and a second additional block in which a key that enables uncloaking of the data only a fixed number of times (e.g., once) is transmitted to the additional user (e.g., via email or text message, etc.).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise. This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s).

The invention claimed is:

1. A method for providing and maintaining secure storage of target data, the method comprising:
   during a first time period in which a server provides a first mapping between user-specific cloaking sequence elements and hidden sequence elements, cloaking the target data at least by
      retrieving, from a database and using (i) a first set of one or more user-specific cloaking sequences and (ii) the first mapping, a first set of one or more hidden sequences, and
      generating cloaked target data at least by applying the target data and the first set of hidden sequences as inputs to a cloaking algorithm;

storing the cloaked target data in a persistent memory;
during a second time period, occurring after the first time period, in which the server provides a different, second mapping between the user-specific cloaking sequence elements and the hidden sequence elements, re-cloaking the cloaked target data at least by
retrieving the cloaked target data from the persistent memory,
again retrieving the first set of hidden sequences from the database,
generating uncloaked target data at least by applying the cloaked target data and the first set of hidden sequences as inputs to an inverse of the cloaking algorithm,
retrieving, from the database and using (i) the first set of user-specific cloaking sequences and (ii) the second mapping, a second set of one or more hidden sequences that is different than the first set of hidden sequences, and
generating re-cloaked target data at least by applying the uncloaked target data and the second set of hidden sequences as inputs to the cloaking algorithm; and
storing the re-cloaked target data in the persistent memory.

2. The method of claim 1, wherein generating cloaked target data at least by applying the target data and the first set of hidden sequences as inputs to the cloaking algorithm includes:
generating once-cloaked target data at least by applying the target data and a first subset of the first set of hidden sequences as inputs to a first portion of the cloaking algorithm; and
generating twice-cloaked target data at least by applying the once-cloaked target data and a second subset of the first set of hidden sequences as inputs to a second portion of the cloaking algorithm.

3. The method of claim 1, wherein either:
cloaking the target data includes cloaking the target data on a bit-by-bit basis, and re-cloaking the cloaked target data includes re-cloaking the cloaked target data on a bit-by-bit basis; or
cloaking the target data includes cloaking the target data on a byte-by-byte basis, and re-cloaking the cloaked target data includes re-cloaking the cloaked target data on a byte-by-byte basis.

4. The method of claim 1, wherein the target data consists of data corresponding to a number of data structures within one or more structured data files, such that cloaking the target data results in cloaking only a portion of the structured data files.

5. The method of claim 4, wherein cloaking the target data includes:
determining that a partial cloaking mode is currently selected; and
in response to determining that the partial cloaking mode is currently selected, cloaking only the portion of the structured data files.

6. The method of claim 1, wherein:
the first set of user-specific cloaking sequences includes a primary user-specific cloaking sequence and a secondary user-specific cloaking sequence;
the first set of hidden sequences includes a primary hidden sequence corresponding to the primary user-specific cloaking sequence and a secondary hidden sequence corresponding to the secondary user-specific cloaking sequence; and the second set of hidden sequences includes one or both of (i) a different primary hidden sequence corresponding to the primary user-specific cloaking sequence and (ii) a different secondary hidden sequence corresponding to the secondary user-specific cloaking sequence.

7. The method of claim 6, wherein applying the first set of hidden sequences and the target data as inputs to the cloaking algorithm includes:
using the primary hidden sequence to identify offset positions within the target data; and
using the secondary hidden sequence to perform one or more operations on the target data at the identified offset positions.

8. The method of claim 7, wherein:
the secondary hidden sequence includes an ordered sequence of bits sets each including one or more bits; and
using the secondary hidden sequence to perform one or more operations on the target data at the identified offset positions includes, at each of the identified offset positions within the target data, inserting a respective one of the bit sets.

9. The method of claim 7, wherein:
the secondary hidden sequence includes an ordered sequence of bits sets each including one or more bits; and
using the secondary hidden sequence to perform one or more operations on the target data at the identified offset positions includes, at each of the identified offset positions within the target data, (i) determining whether the target data includes a bit pattern that matches a respective one of the bit sets, and (ii) removing the bit pattern from the target data only if the bit pattern matches the respective one of the bit sets.

10. The method of claim 1, further comprising:
during the second time period, receiving an indication that a user has changed the first set of user-specific cloaking sequences to a second set of one or more user-specific cloaking sequences; and
in response to receiving the indication, again re-cloaking the re-cloaked target data at least by
retrieving the re-cloaked target data from the persistent memory,
again retrieving the second set of hidden sequences from the database,
generating new uncloaked target data at least by applying the re-cloaked target data and the second set of hidden sequences as inputs to the inverse of the cloaking algorithm,
retrieving, from the database and using (i) the second set of user-specific cloaking sequences and (ii) the second mapping, a third set of one or more hidden sequences, wherein the third set of hidden sequences is different than both the first set of hidden sequences and the second set of hidden sequences, and
generating new re-cloaked target data at least by applying the new uncloaked target data and the third set of hidden sequences as inputs to the cloaking algorithm; and
storing the new re-cloaked target data in the persistent memory.

11. The method of claim 10, wherein receiving the indication that the user has changed the first set of user-specific cloaking sequences to the second set of user-specific cloaking sequences includes:
receiving a user selection of the second set of user-specific cloaking sequences via a graphical user interface.

12. The method of claim 1, wherein the first set of user-specific sequences includes one or more image sequences.

13. The method of claim 1, further comprising:
receiving a master key entered by a user; and
in response to receiving the master key, providing the user with access to the re-cloaked target data stored in the persistent memory at least by uncloaking the re-cloaked target data.

14. The method of claim 1, further comprising:
receiving a first split delegate key entered by a first person other than the user;
receiving a second split delegate key entered by a second person other than the user and the first person; and
in response to receiving at least the first split delegate key and the second split delegate key, providing access to the re-cloaked target data stored in the persistent memory at least by uncloaking the re-cloaked target data.

15. A non-transitory, computer-readable medium storing instructions that, when executed by one or more processors, cause the one or more processors to:
during a first time period in which a server provides a first mapping between user-specific cloaking sequence elements and hidden sequence elements, cloak target data at least by
retrieving, from a database and using (i) a first set of one or more user-specific cloaking sequences and (ii) the first mapping, a first set of one or more hidden sequences, and
generating cloaked target data at least by applying the target data and the first set of hidden sequences as inputs to a cloaking algorithm;
store the cloaked target data in a persistent memory;
during a second time period, occurring after the first time period, in which the server provides a different, second mapping between the user-specific cloaking sequence elements and the hidden sequence elements, re-cloak the cloaked target data at least by
retrieving the cloaked target data from the persistent memory,
again retrieving the first set of hidden sequences from the database,
generating uncloaked target data at least by applying the cloaked target data and the first set of hidden sequences as inputs to an inverse of the cloaking algorithm,
retrieving, from the database and using (i) the first set of user-specific cloaking sequences and (ii) the second mapping, a second set of one or more hidden sequences that is different than the first set of hidden sequences, and
generating re-cloaked target data at least by applying the uncloaked target data and the second set of hidden sequences as inputs to the cloaking algorithm; and
store the re-cloaked target data in the persistent memory.

16. The non-transitory, computer-readable medium of claim 15, wherein the instructions cause the one or more processors to generate the cloaked target data at least by:
generating once-cloaked target data at least by applying the target data and a first subset of the first set of hidden sequences as inputs to a first portion of the cloaking algorithm; and
generating twice-cloaked target data at least by applying the once-cloaked target data and a second subset of the first set of hidden sequences as inputs to a second portion of the cloaking algorithm.

17. The non-transitory, computer-readable medium of claim 15, wherein:
the first set of user-specific cloaking sequences includes a primary user-specific cloaking sequence and a secondary user-specific cloaking sequence;
the first set of hidden sequences includes a primary hidden sequence corresponding to the primary user-specific cloaking sequence and a secondary hidden sequence corresponding to the secondary user-specific cloaking sequence;
the second set of hidden sequences includes one or both of (i) a different primary hidden sequence corresponding to the primary user-specific cloaking sequence and (ii) a different secondary hidden sequence corresponding to the secondary user-specific cloaking sequence; and
the instructions cause the one or more processors to apply the first set of hidden sequences and the target data as inputs to the cloaking algorithm at least by
using the primary hidden sequence to identify offset positions within the target data, and
using the secondary hidden sequence to perform one or more operations on the target data at the identified offset positions.

18. The non-transitory, computer-readable medium of claim 15, wherein the instructions further cause the one or more processors to:
during the second time period, receive an indication that a user has changed the first set of user-specific cloaking sequences to a second set of one or more user-specific cloaking sequences; and
in response to receiving the indication, again re-cloak the re-cloaked target data at least by
retrieving the re-cloaked target data from the first memory,
again retrieving the second set of hidden sequences from the database,
generating new uncloaked target data at least by applying the re-cloaked target data and the second set of hidden sequences as inputs to the inverse of the cloaking algorithm,
retrieving, from the database and using (i) the second set of user-specific cloaking sequences and (ii) the second mapping, a third set of one or more hidden sequences, wherein the third set of hidden sequences is different than both the first set of hidden sequences and the second set of hidden sequences, and
generating new re-cloaked target data at least by applying the new uncloaked target data and the third set of hidden sequences as inputs to the cloaking algorithm; and
store the new re-cloaked target data in the first memory.

19. A computing system comprising:
one or more processors;
a first memory storing target data; and
a second memory storing instructions that, when executed by the one or more processors, cause the computing system to
during a first time period in which a server provides a first mapping between user-specific cloaking sequence elements and hidden sequence elements, cloak the target data at least by retrieving, from a database and using (i) a first set of one or more user-specific cloaking sequences and (ii) the first mapping, a first set of one or more hidden sequences, and generating cloaked target data at least by applying the target data and the first set of hidden sequences as inputs to a cloaking algorithm, storing the cloaked target data in the first memory, during a second time period, occurring after the first time period, in which the server provides a different, second mapping between the user-specific cloaking sequence elements and the hidden sequence elements, re-cloak the cloaked target data at least by retrieving the cloaked target data from the first memory, again retrieving the first set of hidden sequences from the database, generating uncloaked target data at least by applying the cloaked target data and the first set of hidden sequences as inputs to an inverse of the cloaking algorithm, retrieving, from the database and using (i) the first set of user-specific cloaking sequences and (ii) the second mapping, a second set of one or more hidden sequences that is different than the first set of hidden sequences, and generating re-cloaked target data at least by applying the uncloaked target data and the second set of hidden sequences as inputs to the cloaking algorithm, and store the re-cloaked target data in the first memory.

20. The computing system of claim 19, wherein the instructions cause the computing system to generate the cloaked target data at least by:

generating once-cloaked target data at least by applying the target data and a first subset of the first set of hidden sequences as inputs to a first portion of the cloaking algorithm; and generating twice-cloaked target data at least by applying the once-cloaked target data and a second subset of the first set of hidden sequences as inputs to a second portion of the cloaking algorithm.

\* \* \* \* \*